(12) United States Patent
Holcomb et al.

(10) Patent No.: US 10,822,834 B2
(45) Date of Patent: Nov. 3, 2020

(54) KEYLESS INSERTION LOCKING SYSTEM AND METHOD

(71) Applicant: DeWalch Technologies, Inc., Houston, TX (US)

(72) Inventors: James Michael Holcomb, Houston, TX (US); Norman Binz DeWalch, Houston, TX (US); Tyler Dean Todd, II, Houston, TX (US)

(73) Assignee: DeWalch Technologies, Inc, Houston, TX (US)

(*) Notice: Subject to any disclaimer, the term of this patent is extended or adjusted under 35 U.S.C. 154(b) by 0 days.

(21) Appl. No.: 13/836,261

(22) Filed: Mar. 15, 2013

(65) Prior Publication Data

US 2014/0026385 A1 Jan. 30, 2014

Related U.S. Application Data

(63) Continuation of application No. 13/636,666, filed as application No. PCT/US2011/029688 on Mar. 23, 2011.

(Continued)

(51) Int. Cl.
*B23P 19/10* (2006.01)
*B23P 19/04* (2006.01)
(Continued)

(52) U.S. Cl.
CPC .............. *E05B 21/06* (2013.01); *E05B 9/084* (2013.01); *E05B 15/006* (2013.01); *E05B 15/04* (2013.01);
(Continued)

(58) Field of Classification Search
CPC ............ B23P 19/12; B23P 19/10; B23P 19/04; E05B 19/00; E05B 9/084; E05B 17/2011;
(Continued)

(56) References Cited

U.S. PATENT DOCUMENTS 1,843,013 A * 1/1932 Buettner .......................... 70/219
2,119,704 A * 6/1938 Denerich ......................... 70/213
(Continued)

OTHER PUBLICATIONS

Ad/Brochure/etc.—MIIP-Mexican Patent Office—Correspondence dated Nov. 5, 2007 regarding Inner-Tite Application filed in Mexico and as noted (33 pages).*—*(No admission is being made regarding applicability, relevancy, materiality or otherwise and as per IDS Statement Submitted herewith).

(Continued)

*Primary Examiner* — Bayan Salone
(74) *Attorney, Agent, or Firm* — DeWalch Technologies, Inc

(57) ABSTRACT

The present invention, in a non-limiting example embodiment provides a locking apparatus and method for securing locking hardware without the use of a key. In an example embodiment, the apparatus comprises at least a keyless insertion rotatable disk-style, barrel locking apparatus that, in a locked state can be inserted into a securing device without first unlocking, and then, thereafter, locking after insertion. In a nonlimiting example embodiment, unlocking and re-locking requires a key. The present invention, in an example embodiment, also provides features that allow the locking apparatus to enter and exit multiple apertures without requiring a key.

20 Claims, 34 Drawing Sheets

Related U.S. Application Data

(60) Provisional application No. 61/316,826, filed on Mar. 23, 2010, provisional application No. 61/316,851, filed on Mar. 24, 2010.

(51) Int. Cl.
| | | |
|---|---|---|
| *B23P 19/12* | (2006.01) | |
| *E05B 19/00* | (2006.01) | |
| *E05B 17/20* | (2006.01) | |
| *E05B 27/00* | (2006.01) | |
| *E05B 9/08* | (2006.01) | |
| *E05B 21/06* | (2006.01) | |
| *E05B 15/04* | (2006.01) | |
| *E05B 15/00* | (2006.01) | |
| *E05B 67/36* | (2006.01) | |

(52) U.S. Cl.
CPC .......... *E05B 17/2011* (2013.01); *E05B 19/00* (2013.01); *E05B 67/365* (2013.01); *B23P 19/04* (2013.01); *B23P 19/10* (2013.01); *B23P 19/12* (2013.01); *Y10T 29/4984* (2015.01); *Y10T 29/49824* (2015.01); *Y10T 29/49826* (2015.01); *Y10T 70/437* (2015.04); *Y10T 70/439* (2015.04); *Y10T 70/441* (2015.04); *Y10T 70/443* (2015.04); *Y10T 70/7655* (2015.04); *Y10T 70/7661* (2015.04); *Y10T 70/7667* (2015.04)

(58) Field of Classification Search
CPC .......... E05B 27/0032; Y10T 29/49824; Y10T 29/49826; Y10T 29/4984; Y10T 70/437; Y10T 70/439; Y10T 70/441; Y10T 70/443; Y10T 70/7655; Y10T 70/7661; Y10T 70/7667; Y10T 70/7695; Y10T 70/7751; Y10T 70/7802
USPC ......... 29/434, 428; 70/31–34, 370–372, 377, 70/386, 395
See application file for complete search history.

(56) References Cited

U.S. PATENT DOCUMENTS

| | | | | |
|---|---|---|---|---|
| 3,002,368 | A * | 10/1961 | Moberg | 70/14 |
| 3,835,674 | A * | 9/1974 | Hoyt | 70/34 |
| 4,063,434 | A * | 12/1977 | Moberg | 70/34 |
| 4,441,343 | A * | 4/1984 | Nielsen et al. | 70/34 |
| 4,519,225 | A * | 5/1985 | Simmler et al. | 70/34 |
| 4,637,234 | A * | 1/1987 | Mielonen | 70/34 |
| 4,742,703 | A * | 5/1988 | DeWalch et al. | 70/366 |
| 5,050,413 | A * | 9/1991 | Stillwagon et al. | 70/386 |
| 5,357,835 | A | 10/1994 | Moellering | |
| 5,440,909 | A * | 8/1995 | Ely | E05B 19/00 70/395 |
| 5,697,239 | A * | 12/1997 | Hanneman et al. | 70/493 |
| 5,735,153 | A * | 4/1998 | Hanneman et al. | 70/493 |
| 5,829,280 | A * | 11/1998 | Chen | 70/49 |
| 5,960,653 | A * | 10/1999 | DeWalch et al. | 70/164 |
| 6,032,989 | A * | 3/2000 | DeWalch et al. | 292/256.6 |
| 6,684,670 | B1 * | 2/2004 | Agbay | E05B 67/365 70/14 |
| 7,040,646 | B2 * | 5/2006 | Pare | 280/507 |
| 7,213,424 | B2 * | 5/2007 | Dewalch | 70/19 |
| 7,234,330 | B2 * | 6/2007 | Tseng | 70/491 |
| 7,703,311 | B2 * | 4/2010 | Agbay | 70/366 |
| 7,775,071 | B2 * | 8/2010 | Agbay | 70/34 |
| 8,474,289 | B2 * | 7/2013 | Solomon | 70/34 |
| 2008/0034819 | A1 * | 2/2008 | DeWalch | 70/164 |
| 2008/0105006 | A1 * | 5/2008 | Agbay | 70/34 |
| 2012/0167369 | A1 * | 7/2012 | Holcomb et al. | 29/428 |
| 2013/0008008 | A1 * | 1/2013 | Holcomb et al. | 29/428 |
| 2013/0133383 | A1 * | 5/2013 | Solomon | 70/34 |

OTHER PUBLICATIONS

Ad/Brochure/etc.—Highfield—AMLR Ring News and as noted: dated Oct. 21, 2010 (2 pages).*—*(No admission is being made regarding applicability, relevancy, materiality or otherwise and as per IDS Statement Submitted herewith).

Ad/Brochure/etc.—Highfield—AMLR Ring and as noted; Estimate prior to May 5, 2011 (1 page).*—*(No admission is being made regarding applicability, relevancy, materiality or otherwise and as per IDS Statement Submitted herewith).

Foreign Corr.—E-mail/Letter from Applicant to CA Foreign Counsel dated Sep. 1, 2017 regarding CIPO Office Action Response concerning Canadian Patent Application No. 2,793,565 (10 pages).

Foreign Corr.—E-mail/Letter from CA Foreign Counsel to Applicant dated Dec. 8, 2017 regarding CIPO Office Action Response concerning Canadian Patent Application No. 2,793,565 (6 pages).

Foreign Corr.—E-mail/Letter correspondence between Applicant and MX Foreign Counsel dated Jul. 24, 2015 and prior regarding MX Office Action Response concerning Mexican Patent Application No. MX/a/2012/010932 (10 pages).

ISR and Written Opinion for International Application No. PCT/US2011/029688 filed Sep. 21, 2012 (5 pages).

International Preliminary Report on Patentability for International Application No. PCT/US04132726 filed Sep. 21, 2012 (First 3 pages only (out of 125 pages)).

International Application No. PCT/US04/32726 filed Sep. 21, 2012 (4 pages).

Notice of Non-Final Rejection dated Mar. 25, 2014 in connection with related U.S. Appl. No. 13/842,933 (9 pages).

Applicant's Response with Amendment dated Sep. 25, 2014 in connection with related U.S. Appl. No. 13/842,933 (15 pages).

Notice of Non-Compliant dated Jan. 15, 2015 in connection with related U.S. Appl. No. 13/842,933 (5 pages).

Applicant's Amendment dated Jun. 12, 2015 in connection with related U.S. Appl. No. 13/842,933 (12 pages).

Final Rejection dated Sep. 23, 2015 in connection with related U.S. Appl. No. 13/842,933 (7 pages).

Applicant's Response with Amendment including RCE dated Mar. 23, 2016 in connection with related U.S. Appl. No. 13/842,933 (39 pages).

Non-Final Rejection dated May 2, 2016 in connection with related U.S. Appl. No. 13/842,933 (8 pages).

Applicant's Response with Amendment dated Nov. 2, 2016 in connection with related U.S. Appl. No. 13/842,933 (13 pages).

Final Rejection dated Jan. 31, 2017 in connection with related U.S. Appl. No. 13/842,933 (7 pages).

Applicant's RCE with Amendment and Request for Suspension dated May 31, 2017 in connection with related U.S. Appl. No. 13/842,933 (22 pages).

Non-Final Rejection dated Nov. 1, 2017 in connection with related U.S. Appl. No. 13/842,933 (6 pages).

Applicant's Amendment with IDS dated Mar. 1, 2018 in connection with related U.S. Appl. No. 13/842,933 (91 pages).

Final Rejection dated Apr. 10, 2018 in connection with related U.S. Appl. No. 13/842,933 (12 pages).

Applicant's Amendment with RCE and Suspension dated Oct. 10, 2018 in connection with related U.S. Appl. No. 13/842,933 (20 pages).

Notice of Allowance dated Nov. 2, 2018 in connection with related U.S. Appl. No. 13/842,933 (9 pages).

Applicant's Letter for Suspension dated Nov. 20, 2018 in connection with related U.S. Appl. No. 13/842,933 (5 pages).

Applicant's Amendment dated Feb. 14, 2019 in connection with related U.S. Appl. No. 13/842,933 (15 pages).

Notice of Allowance dated Feb. 27, 2019 in connection with related U.S. Appl. No. 13/842,933 (9 pages).

Applicant's RCE and IDS dated May 21, 2019 in connection with related U.S. Appl. No. 13/842,933 (786 pages).

Email/Letter from Foreign Counsel dated Sep. 16, 2012 regarding filing a Canadian Patent Application based on PCT International Phase Application No. PCT/US2011/029688 (4 pages).

(56) References Cited

OTHER PUBLICATIONS

Email/Letter from Foreign Counsel dated Sep. 18, 2012 regarding filing a Canadian Patent Application based on PCT International Phase Application No. PCT/US2011/029688 (4 pages).
Letter from Foreign Counsel dated Jan. 29, 2013 regarding the original filing certificate as issued by the Canadian Intellectual Property Office filing a Canadian Patent Application dated Dec. 6, 2012 in connection with Canadian Patent Application No. 2,793,565 (7 pages).
E-mail/Letter from Foreign Counsel dated Apr. 7, 2016 regarding Acknowledgement of Request for Examination as issued by the Canadian Intellectual Property Office dated Mar. 30, 2016 in connection with Canadian Patent Application No. 2,793,565 (3 pages).
E-mail/Letter from Foreign Counsel dated Mar. 13, 2017 regarding the Office Action from the Canadian Intellectual Property Office dated Mar. 6, 2017 in connection with Canadian Patent Application No. 2,793,565 (5 pages).
E-mail/Letter from Applicant dated Sep. 1, 2017 regarding the Office Action from the Canadian Intellectual Property Office dated Mar. 6, 2017 in connection with Canadian Patent Application No. 2,793,565 (10 pages).
E-mail/Letter from Foreign Counsel dated Sep. 5, 2017 regarding the Office Action from the Canadian Intellectual Property Office dated Mar. 6, 2017 in connection with Canadian Patent Application No. 2,793,565 (4 pages).
E-mail/Letter from CA Foreign Counsel to Applicant dated Sep. 6, 2017 regarding CIPO Office Action Response concerning Canadian Patent Application No. 2,793,565 (14 pages).
E-mail/Letter from Applicant to CA Foreign Counsel dated May 30, 2018 regarding CIPO Office Action Response concerning Canadian Patent Application No. 2,793,565 (13 pages).
E-mail/Letter from CA Foreign Counsel to Applicant dated Jun. 1, 2018 with copy of filed Office Action Response concerning Canadian Patent Application No. 2,793,565 (6 pages).
E-mail/Letter from CA Foreign Counsel to Applicant dated Oct. 10, 2018 with copy of Notice of Allowance concerning Canadian Patent Application No. 2,793,565 (2 pages).
E-mail/Letter from Applicant to CA Foreign Counsel dated Mar. 5, 2019 with instructions to pay Final Fee (2 pages).
Letter from CA Foreign Counsel to Applicant dated May 12, 2019 with Letters Patent concerning Canadian Patent No. 2,793,565.

* cited by examiner

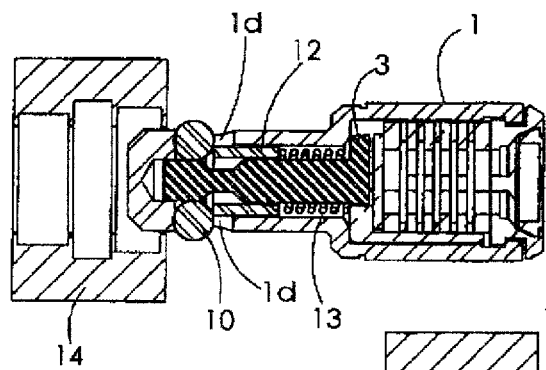
FIG. 10a
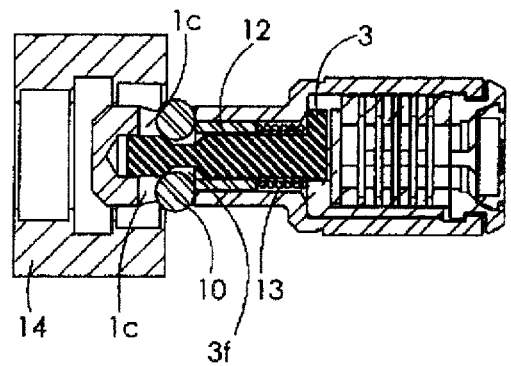
FIG. 10b
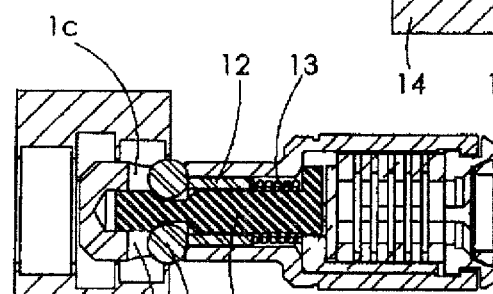
FIG. 10c
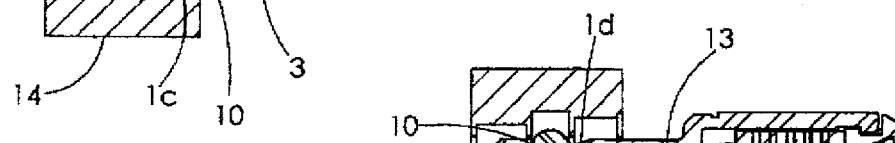
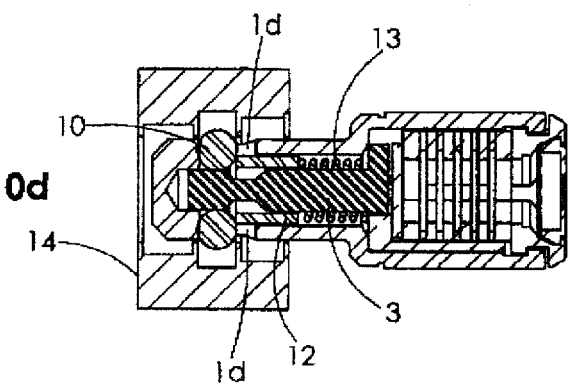
FIG. 10d
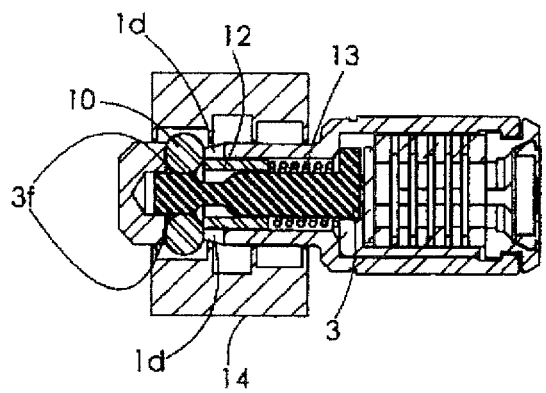
FIG. 10e

KEYLESS INSERTION LOCKING SYSTEM AND METHOD

CROSS-REFERENCE TO RELATED APPLICATIONS

This application is a continuation of U.S. Nonprovisional application Ser. No. 13/636,666 filed on Sep. 21, 2012, which is a national stage of International Application No. PCT/US2011/029688, filed Mar. 23, 2011, which claims the benefit of U.S. Provisional Application No. 61/316,826 filed on Mar. 23, 2010, and U.S. Provisional Application No. 61/316,851 filed on Mar. 24, 2010.

All written material, figures, content and other disclosure in each of the above-referenced applications is hereby incorporated by reference.

BACKGROUND OF THE INVENTION

The present invention relates generally to a locking apparatus and more specifically it relates to a locking system, apparatus and method for fostering ease of installation of various securing devices, as well as controlling access and preventing unauthorized access to such various securing devices used in, for example, the gas, water and electric utility services industries, and those used in other suitable industries as well and it relates to other aspects features as well as provided herein.

Electrical service providers generally deliver electricity to their customers via power lines buried underground or distributed along poles or towers overhead. The provider's power lines are usually distributed from a power generation station to numerous sets of customer lines, so that customers can then use the power to satisfy their various electrical needs. To measure delivered power so that customers can be billed in proportion to their usage, service providers typically terminate their power lines at a customer's home or business facility through a metered socket box, various designs for which are well known. Natural gas and water service providers deliver and meter services in a similar method.

For example, one previously known electric meter box consists of two sets of electrical posts, with a provider's transmission lines being connected to one set of posts, and the customer's service lines to the other set. In order to measure the amount of electricity a customer uses, the meter box is configured to accept a watt-hour meter or another electricity usage measurement device, which, when plugged into the socket box, permits transmission of electricity from the provider to the customer and allows the amount of transmitted electricity to be accurately measured, so that the provider can charge the customer for power usage at an appropriate rate. The electrical service providers utilize many security apparatus to deter and prevent tampering with the meter. Typically, these security apparatus are locked with a barrel lock. This is largely true also for utility service providers of natural gas and water.

The present invention is a new type of barrel lock that in the locked state can be inserted into a securing device without first unlocking, and then, thereafter, locking after insertion. Unlocking and re-locking requires a key. The present invention is distinct from existing devises and products because it can enter and exit multiple apertures without requiring a key, which an enables a new method of locking with a keyless insertion rotatable disk style barrel lock.

The present invention provides various features and advantages which are of notable value to the user such as for example, improvement in key management and security of key access. It is common for the installation of security devices to be performed by contractors or employees who then also have control over the key(s), for example, to perform such services. If this activity could be performed without a key, then the utility company could much better manage key security. Current market solutions do not entirely address this problem. The present invention can work with electricity meter rings or enclosure lid locking devices, water or gas meter and transmission locking devices and many other devices because it can pass through multiple apertures without the use of a key.

There remains a need for an apparatus and method for easily securing at least one structure or a plurality of structures, used with, for example, a utility service enclosure, or more particularly, a watthour meter box having a removable cover with the apparatus being adaptable for use in various configurations.

Those of skill in the art will appreciate the example embodiments of the present invention which addresses the above needs and other significant needs the solution to which are discussed hereinafter.

SUMMARY OF THE INVENTION

The present invention provides, in a non-limiting example embodiment, which will be described subsequently in greater detail, a system, method and apparatus to secure a locking assembly or hardware without the use of a key.

To attain this, one non-limiting embodiment of the present invention comprises a locking apparatus configured in an example embodiment to be keyless. As such, the use of the locking apparatus provides a new method of locking without use of a key.

The locking apparatus, in an example embodiment, comprises a keyless insertion rotatable cylinder lock and also a key with rotating elements.

In an example embodiment, the key is the same as that described in U.S. Pat. No. 4,742,703.

In another example embodiment, there is provided a keyless insertion barrel lock (in some embodiments, a cylinder lock) with rotating locking mechanisms.

In another example embodiment, there is provided a keyless insertion cylinder lock with rotating locking mechanisms and key with rotating elements.

In another example embodiment, there is provided a locking assembly that can be installed without use of a key or any special tools.

In another example embodiment, there is provided a keyless insertion rotatable disk locking assembly that can be shipped to the customer in the locked state and installed into a various types of locking devices without requiring use of a key or any special tools, thereby, providing an increased level of security.

In another example embodiment, there is provided a keyless insertion rotatable disk locking assembly that can be shipped to the customer in the locked state and installed into a variety of locking devices that may have multiple apertures of ingress and egress possibly requiring locking members (or in some embodiments locking balls or ball bearings) to contract multiple times prior to full insertion and final locking ball expansion without requiring use of a key.

In another example embodiment, there is provided a locking method enabling a user to receive and install a locked lock into various devices that may offer multiple apertures of ingress and egress possibly requiring locking balls to contract multiple times prior to full insertion and final locking ball expansion without requiring use of a key thereby providing an increased level of security.

In another example embodiment, there is provide a keyless insertion rotatable disk style barrel lock that simplifies and expedites the installation process by eliminating the need for an installation key.

In another example embodiment, there is provided a keyless insertion rotatable disk style barrel lock that can be made with or without anti-rotation features described in U.S. Pat. No. 7,213,424 which is incorporated by reference herein.

In another example embodiment, there is provided a keyless insertion rotatable disk style barrel lock for use with electric utility meter boxes.

In another example embodiment, there is provided a keyless insertion rotatable disk style barrel lock for use with electric utility meter rings.

In another example embodiment, there is provided a keyless insertion rotatable disk style barrel lock that can be integrated and retained within a meter ring facilitating quick installation.

In another example embodiment, there is provided a keyless insertion rotatable disk style barrel lock that can be used by multiple service providers and other users of barrel locks, particularly those require a keyless insertion lock to pass multiple apertures of ingress and egress possibly requiring locking balls to contract multiple times prior to full insertion and final locking ball expansion without requiring use of a key.

In another example embodiment, there is provided a locking assembly that can be operated repeatedly.

In another example embodiment, there is provided a locking assembly that can be removed with a key.

In another example embodiment, there is provided means to prevent the locking assembly removal without a key.

In another example embodiment, there is provided a plunger style barrel lock that may be installed without a key.

In another example embodiment there is provided a retaining pin that can be installed when in the locked position.

In an example embodiment, which will be described subsequently in greater detail, there is provided a barrel lock to secure at least one structure or a plurality of structures, to prevent unauthorized access, for example, to secure a utility service enclosure, such as for example, a meter box having a removeable panel or lid.

The content and disclosure of each of the following applications/publications to the extent permitted are specifically hereby incorporated by reference: U.S. Nonprovisional application Ser. No. 13/636,666 filed on Sep. 21, 2012; U.S. Provisional Application No. 61/316,826 filed on Mar. 23, 2010; and U.S. Provisional Application No. 61/316,851 filed on Mar. 24, 2010; International Application No. PCT/US2011/029688, filed Mar. 23, 2011; U.S. Pat. No. 4,742,703; U.S. patent application Ser. No. 12/660,990 filed on Mar. 8, 2010; U.S. Pat. No. 7,213,424, Issued on May 8, 2007; U.S. patent application Ser. No. 11/800,863 filed on May 7, 2007.

Additionally, all written material, figures, content and other disclosure in each of the above-referenced applications, is hereby incorporated by reference. In addition, the instant application claims priority as noted above.

There has thus been outlined, rather broadly, features of example embodiments of the invention in order that the detailed description thereof may be better understood, and in order that the present contribution to the art may be better appreciated. There are additional features of example embodiments of the invention that will be described hereinafter.

In this respect, before explaining at least one example embodiment of the invention in detail, it is to be understood that the example embodiments are not limited in its application to the details of construction and to the arrangements of the components set forth in the following description or illustrated in the drawings. Various example embodiments are capable of other further embodiments and of being practiced and carried out in various ways. Also, as emphasized, it is to be understood that the phraseology and terminology employed herein are for the purpose of the description and should not be regarded as limiting.

To the accomplishment of the above and related objects, example embodiments of the invention may be embodied in the form illustrated in the accompanying drawings, attention being called to the fact, however, that the drawings are illustrative only, and that changes may be made in the specific construction illustrated.

Other aspects and advantages of the present invention will become obvious to the reader and it is intended that these aspects and advantages are within the scope of the present invention.

These and other aspects, features, and advantages of example embodiments of the present invention will become apparent from the drawings, the descriptions given herein, and the appended claims. Further aspects are also indicated herein in various example embodiments of the invention. However, it will be understood that the above-listed objectives and/or advantages of example embodiments are intended only as an aid in quickly understanding aspects of the example embodiments, are not intended to limit the embodiments of the invention in any way, and therefore do not form a comprehensive or restrictive list of objectives, and/or features, and/or advantages.

BRIEF DESCRIPTION OF THE DRAWINGS

Various aspects, example embodiments and other example embodiments, features and attendant advantages of the embodiments of the invention will become fully appreciated as the same becomes better understood when considered in conjunction with the accompanying drawings, and wherein:

FIGS. 10a, 10b, 10c, 10d and 10e are cross-sectional views of a keyless insertion barrel lock in accordance with an embodiment of the present invention. In this view, the lock is advanced to enter multiple apertures in receiving hardware which illustrates functional operation in one example embodiment. In FIG. 10a, the lock is approaching the first aperture with the rotor stem 3 in the locked position, the biasing member is extended and balls 10 extended. In FIG. 10b, the lock is entering the first aperture with the rotor stem 3 in the locked position, biasing member slightly retracted and balls slightly receded. In FIG. 10c, the lock is entering the first aperture with the rotor stem 3 in the locked position, biasing member retracted and balls slightly recessed. The balls are recessed into the lock case to enable keyless insertion of locked lock. In FIG. 10d, the balls are extended after passing through second aperture with the rotor stem 3 in the locked position and biasing member extended. In FIG. 10d, the balls are extended after passing through third aperture with the rotor stem 3 in the locked position and biasing member extended. In each case, the locked lock cannot be removed without state change from locked to un-locked.

In FIG. 20a, the lock is approaching the first aperture with the rotor stem 103 in the locked position, the biasing member is extended and balls 110 extended. In FIG. 20b, the lock is entering the first aperture with the rotor stem 103 in the locked position, biasing member slightly retracted and balls slightly receded. In FIG. 20c, the lock is entering the first aperture with the rotor stem 103 in the locked position, biasing member retracted and balls slightly recessed. The balls are recessed into the lock case to enable keyless insertion of locked lock. In FIG. 20d, the balls are extended after passing through second aperture with the rotor stem 103 in the locked position and biasing member extended. In FIG. 20d, the balls are extended after passing through third aperture with the rotor stem 103 in the locked position and biasing member extended. In each case, the locked lock cannot be removed without state change from locked to un-locked.

In FIG. 30a, the lock is approaching the first aperture with the plunger stem 203 in the locked position, the biasing member is extended and balls 210 extended. In FIG. 30b, the lock is entering the first aperture with the plunger stem 203 in the locked position, biasing member slightly retracted and balls slightly receded. In FIG. 30c, the lock is entering the first aperture with the plunger stem 203 in the locked position, biasing member retracted and balls slightly recessed. The balls are recessed into the lock case to enable keyless insertion of locked lock. In FIG. 30d, the balls are extended after passing through second aperture with the plunger stem 203 in the locked position and biasing member extended. In FIG. 30d, the balls are extended after passing through third aperture with the plunger stem 203 in the locked position and biasing member extended. In each case, the locked lock cannot be removed without state change from locked to un-locked.

Figure 1:
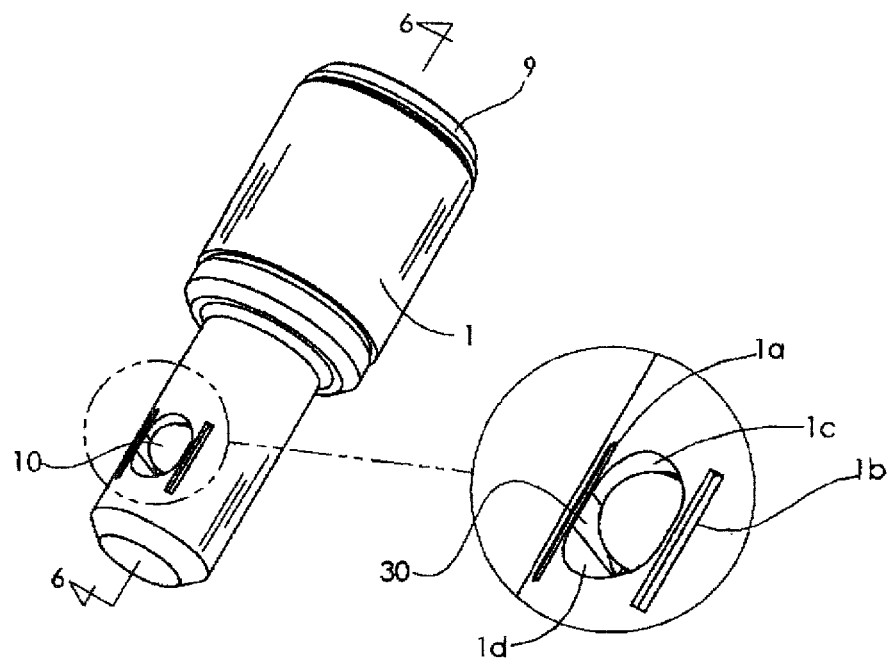
FIG. 1 is a perspective view of a keyless insertion barrel lock in accordance with an embodiment of the present invention. In this view, the locking members (or in this example embodiment, balls 10) are expanded, rotor stem 3 in the locked position and the biasing member extended.

Note that FIGS. 18-30 and 31-62 and descriptions related thereto, include various views related to the description and example embodiments including certain members, components, structures, methodologies, and configurations in accord with possible embodiments of the invention.

While various example embodiments of the invention will be described herein, it will be understood that it is not intended to limit the invention to those embodiments. On the contrary, it is intended to cover all alternatives, modifications, and equivalents included within the spirit of the invention.

DETAILED DESCRIPTION OF THE INVENTION

Turning now descriptively to the drawings, in which similar reference characters may denote similar elements throughout the several views, the attached figures illustrate a locking apparatus for securing locking devices requiring a barrel lock with the locking apparatus, in an example embodiment, comprising a key and a keyless insertion barrel lock.

Figure 6:
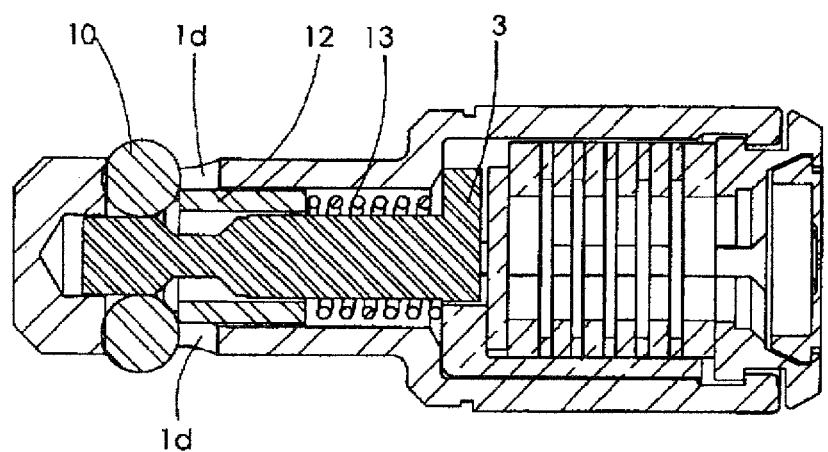
FIG. 6 is a cross-sectional view of a keyless insertion barrel lock in accordance with an embodiment of the present invention. In this view, the lock assembly balls 10 are expanded, rotor stem 3 in the locked position and the biasing member extended.
Figure 7:
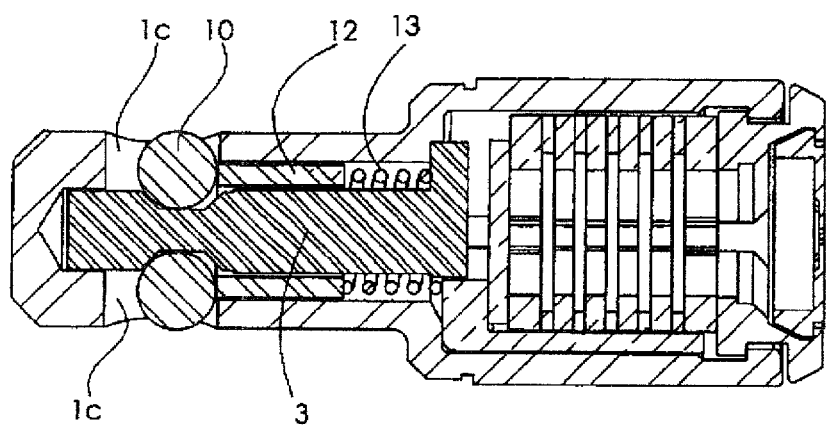
FIG. 7 is a cross-sectional view of a keyless insertion barrel lock in accordance with an embodiment of the present invention. In this view, the lock assembly balls 10 are recessed, rotor stem 3 in the locked position and the biasing member retracted.

One aspect of the current invention comprises a method for retaining a barrel lock able to be inserted and removed from locking hardware capable of receiving a barrel lock. FIGS. 10a through 10e show an example embodiment method for retaining a barrel lock. Referring to FIG. 10 a barrel lock 1 is inserted into locking hardware 14. Referring to FIG. 10b this causes a retainer 10 to retract as a result of inserting the barrel lock into the locking hardware 14. The retraction is a result of the interaction between the retainer 10 and the locking hardware 14. When the barrel lock is inserted the retainer 10 is forced into recess 3f in retainer extender 3. Referring to FIG. 10e the retainer 10 is extended when in an inserted position as shown in FIG. 10e in the locking hardware 14. The retainer 10 is prevented from retracting by the retainer extender 3 and specifically by surface 3e, when a force is exerted on the barrel lock in a direction generally opposite the direction in which the barrel lock was inserted by retainer extender 3. Another aspect of the invention comprises a barrel lock retainer for retaining a barrel lock in locking hardware capable of retaining a barrel lock such as a meter locking ring or ring-less meter locking hardware or other locking hardware as known by those skilled in the art. A barrel lock 1 as shown in FIG. 1 comprises an example barrel lock retainer. The example barrel lock has a locked configuration that prevents the barrel lock from being removed from the hardware in which it is installed without the use of a proper key; and an unlocked configuration which allows removal of the barrel lock from the hardware in which it is installed when unlocked with the proper key. Referring to FIG. 6, the example embodiment retainer comprises: a retractable retaining member 10 (in the current example a ball) and a retaining member extender 3. The retaining member extender is configured to allow insertion of the barrel lock when the lock is in a locked configuration as shown in FIG. 7 and prevent removal of the barrel lock in the locked configuration as shown in FIG. 6. The retaining member extender 3 is configured to cooperate with the locking hardware to retract the retaining member 10 by allowing the retaining member to be urged into the recess 3*f* in the retaining member extender 3 when the lock is inserted into the hardware.

Figure 26:
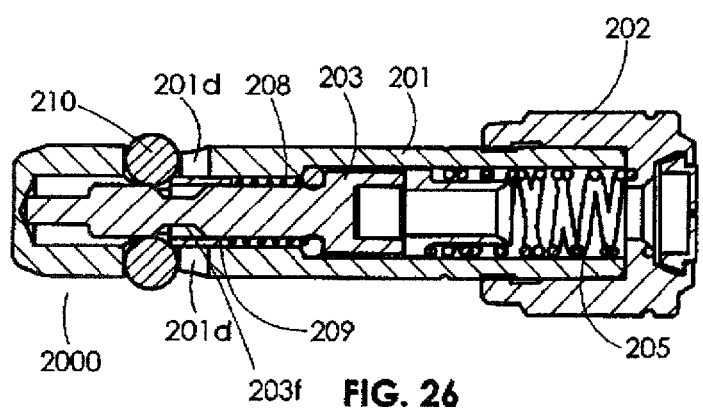
FIG. 26 is a cross-sectional view of a keyless insertion barrel lock in accordance with an embodiment of the present invention. In this view, the lock assembly balls 210 are expanded, plunger stem 203 in the locked position and the biasing member extended.
Figure 27:
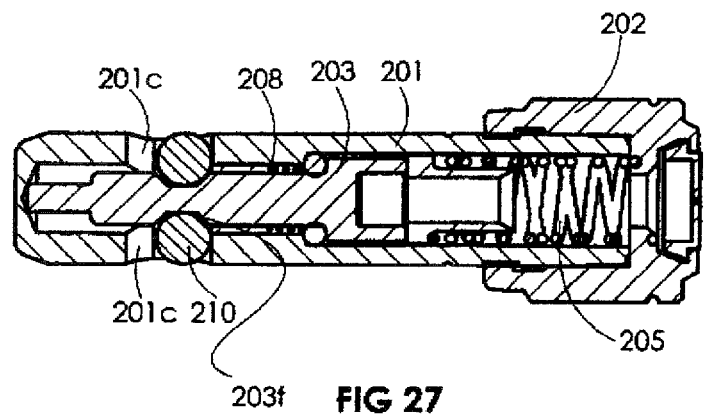
FIG. 27 is a cross-sectional view of a keyless insertion barrel lock in accordance with an embodiment of the present invention. In this view, the lock assembly balls 210 are recessed, plunger stem 203 in the locked position and the biasing member retracted.

Another aspect of the present invention comprises a barrel lock installable in locking hardware and the barrel lock has a locked and an un-locked configuration. FIG. 26 shows an example barrel lock comprising a retainer shown generally at 2000. The retainer comprises: a retaining member 210, a biasing member 209 biased to exert a force on the retaining member 210 and a retainer extender 203. The retainer extender has a reduced cross-section shown generally at 203*f* and is configured to allow retraction of the retaining member 210 as shown in FIG. 27. When the retaining member is forced in a direction generally opposite to the force exerted by the biasing member the retaining member 210 moves into the recess at 203*f* and retracts to allow the barrel lock to be inserted without the use of a key.

Figure 52:
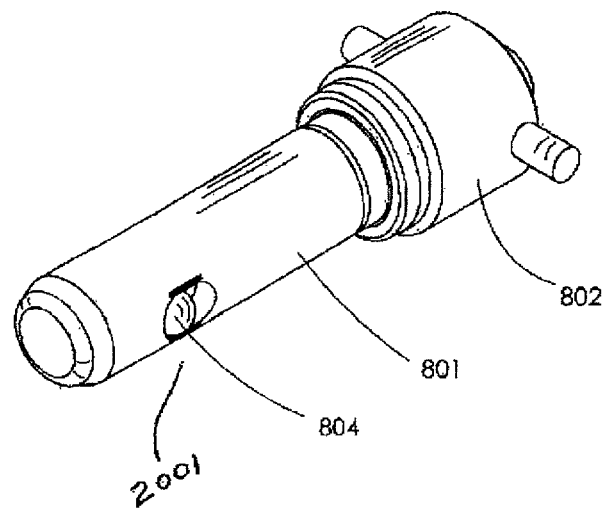
FIG. 52 is a perspective view of a keyless insertion lock with alternate unlocking means in accord with one possible embodiment of the invention.
Figure 53:
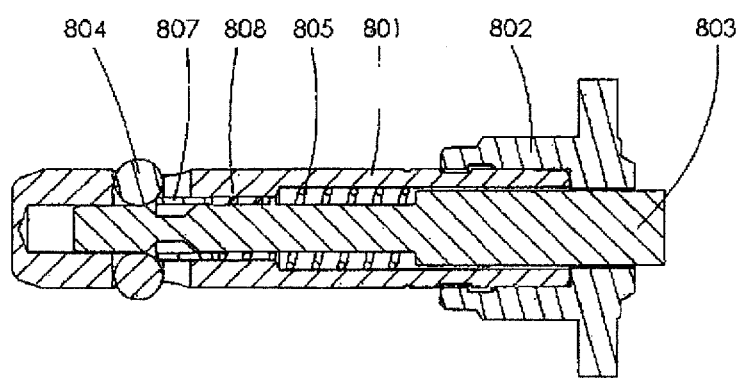
FIG. 53 is a cross sectional view of a keyless insertion lock from FIG. 52.
Figure 54:
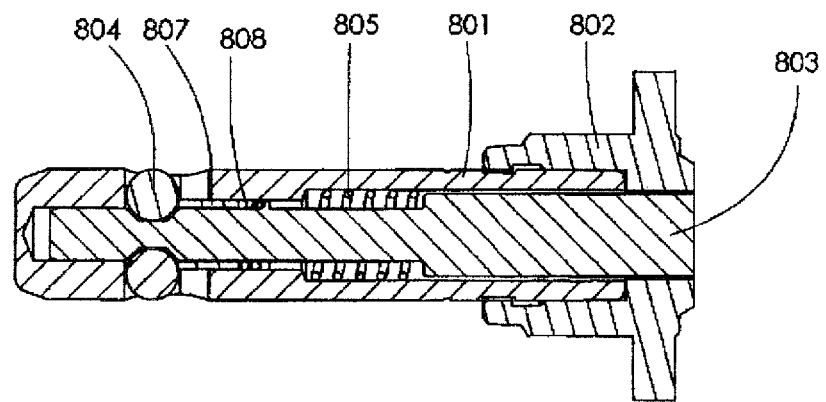
FIG. 54 is a cross sectional view of a keyless insertion lock from FIG. 52.
Figure 55:
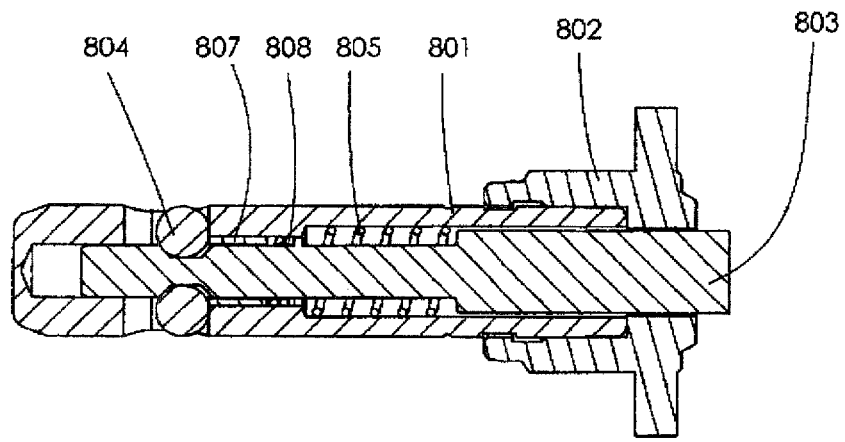
FIG. 55 is a cross sectional view of a keyless insertion lock from FIG. 52.

Another aspect of the invention comprises a retaining pin for installation in hardware capable of receiving a retaining pin as is well known by those skilled in the art. An example embodiment retaining pin is shown in FIG. 52. The example retaining pin has a locked configuration as shown in FIG. 53 and an un-locked configuration as shown in FIG. 54. FIG. 55 shows the retaining pin in the locked position with the retaining members retracted as would occur when the retaining pin is inserted into the hardware. The retaining pin comprises: a uni-directional retaining member shown generally at 2001 in FIG. 52. The uni-directional retaining member is configured to interact with the hardware during insertion of the retaining pin when the retaining pin is in a locked configuration. During the interaction with the hardware, the retaining member retracts sufficiently to allow the barrel lock to be inserted as shown in FIG. 55. The retaining member is configured to interact with the hardware during attempted removal of the retaining pin from the hardware when the retaining pin is in a locked configuration as shown in FIG. 53. The retaining member 804 is biased by the biasing member 807 and 808 in a direction to allow retainer extender 803 to prevent retraction of the retaining member 804 sufficiently to prevent the barrel lock from being removed.

Referring generally to FIGS. 1-10, example embodiments of the present invention are illustrated. In various example embodiments, the barrel lock may be used with a variety of types of hardware adapted to receive a barrel lock so as to secure a given locking device and may be used secure a numerous other types of locking devices or hardware. In an example embodiment of the invention, the barrel lock is adapted for use with various types of hardware capable of receiving a barrel lock as noted. In one example embodiment, the barrel lock comprises a body, at least one locking member and a biasing member for biasing the locking member into an extended mode. In other example embodiments, a plurality of locking members are provided. When a sufficient external force is applied to the at least one locking member, the locking member moves into a retracted mode, such that at least a portion of the locking member is retracted into the body and such that the barrel lock may be inserted into the hardware (Hardware may be any of various types of structure or devices adapted for receiving a barrel lock. The barrel lock is axially insertable in example embodiments as noted herein).

The following provides a description of an example embodiment of the locking apparatus. The motion of locking members (or ball bearings 10), in this example embodiment, will be described longitudinally along the axis of case 1 as proximal and distal relative to end cap 9; the motion of balls 10 will also be described radially relative to center axis of case 1. Also, in this example embodiment, to "recess", "recede" or "retract" shall refer to travelling toward the case 1 axis and to "extend" shall refer to travelling away from the case 1 axis.

Figure 2:
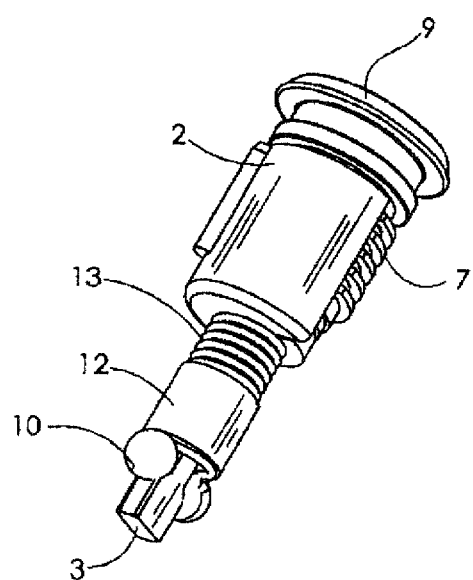
FIG. 2 is the same perspective view as FIG. 1 with case 1 hidden to show internal components.

Referring to FIGS. 1 and 2, the locking assembly is shown with ball bearings 10 extended from inside case 1 through slots 30 on opposing sides of case. Ball position boundaries are partially defined by the following elements of case 1: 1*a*, 1*b*, and slot 30 ends 1*c* and 1*d*. Retaining protuberances 1*a* and 1*b* restrain the balls within the lock assembly and present a physical boundary within which balls can recede toward or extend from the case center axis in an example embodiment. The ball bearings (e.g., 10) track within the respective slots longitudinally parallel with the case center axis and are bound by slot 30 ends 1*c* and 1*d*.

Figure 8A:
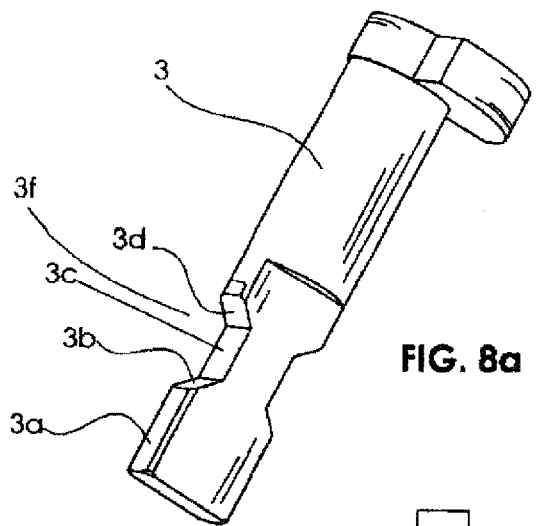
FIG. 8a is a perspective view of rotor stem of the keyless insertion barrel lock.

The positioning of balls 10 is further constrained by the geometry of rotor stem 3. Referring to FIG. 8, rotor stem 3 has four surfaces (3*a*, 3*b*, 3*c*, and 3*d*) controlling the position and movement (and behavior) of balls 10. In the present embodiment the rotor stem or retainer extender 3 has a recess 3*f*, defined generally by surfaces 3*b*, 3*c* and 3*d*, for receiving the retaining members which in the present invention are balls. Surface 3*c* defines the boundary of recessing travel of the balls 10 so that the balls can recede toward access no further than surface 3*c*. Surface 3*d* in cooperation with surface 1*d* of slot 30 defines the boundary of proximal longitudinal travel of ball 10. Surface 3*a* presents a hard bearing surface and interference with the ball movement that prevents the balls from recessing.

Referring to FIG. 6, the balls 10 are shown at the most extended state. The balls are constrained by surface 3*a*, surface 1*c* of slot 30 and retaining protuberances 1*a* and 1*b*. At this most extended state, the spherical center of balls 10 remains within the lock case 1. Consequently, any effort to push the lock into and through an aperture would generate (or render) forces both proximally longitudinal and radial toward center.

Figure 9:
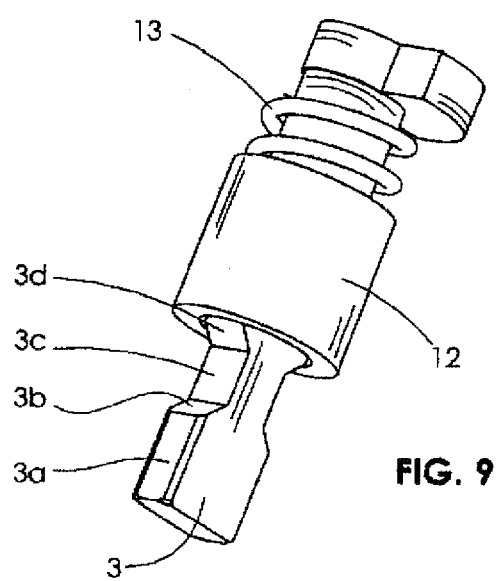
FIG. 9 is a perspective view of the rotor stem with biasing mean of the keyless insertion barrel lock.
Figure 11:
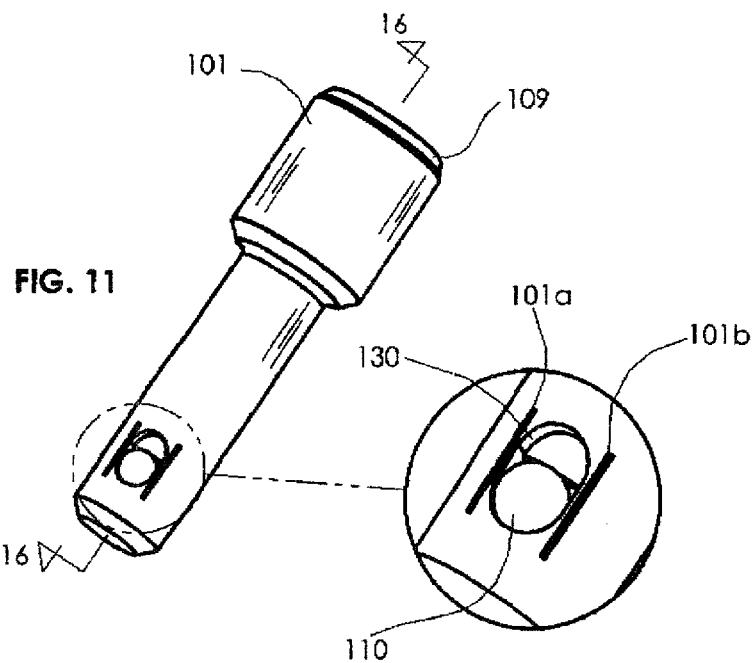
FIG. 11 is a perspective view of a keyless insertion barrel lock in accordance with an embodiment of the present invention. In this view, the locking members (or in this example embodiment, balls 110) are expanded, rotor stem 103 in the locked position and the biasing member extended.
Figure 12:
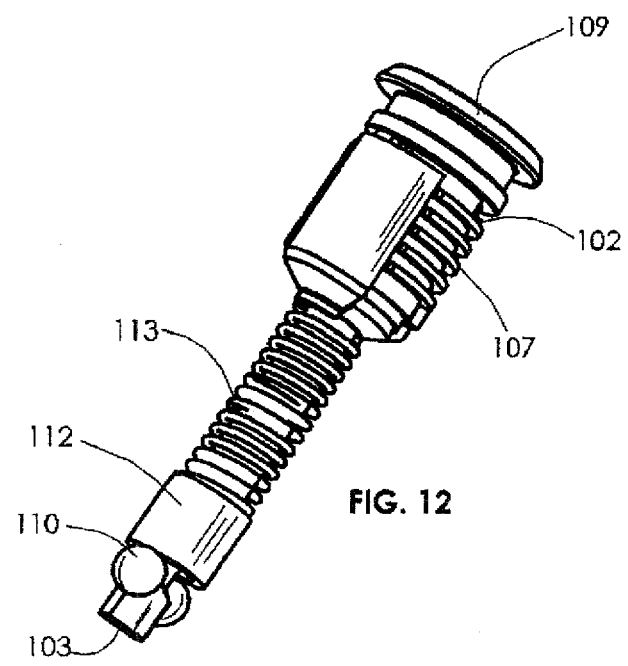
FIG. 12 is the same perspective view as FIG. 11 with case 101 hidden to show internal components.

Referring to FIGS. 6 and 9, sleeve 13 and compression spring 13 cooperatively biases balls 10 toward surface 1*c* of slot 30. Sleeve 13 bears on balls 10. Compression spring 13 permits translation of the sleeve along the case axis and biases toward a rest position at the most extended position or state as described in FIGS. 1, 2 and 6.

Figure 3:
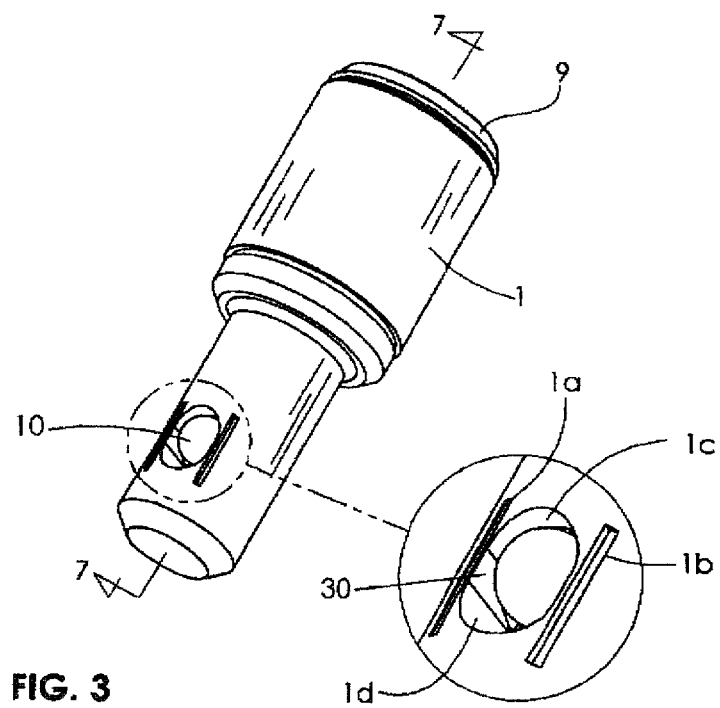
FIG. 3 is a perspective view of a keyless insertion barrel lock in accordance with an embodiment of the present invention. In this view, the lock assembly balls 10 are recessed, rotor stem 3 in the locked position and the biasing member retracted.
Figure 4:
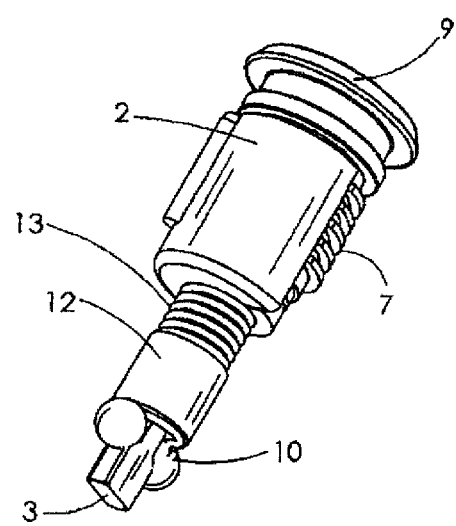
FIG. 4 is the same perspective view as FIG. 3 with case 1 hidden to show internal components.
Figure 5:
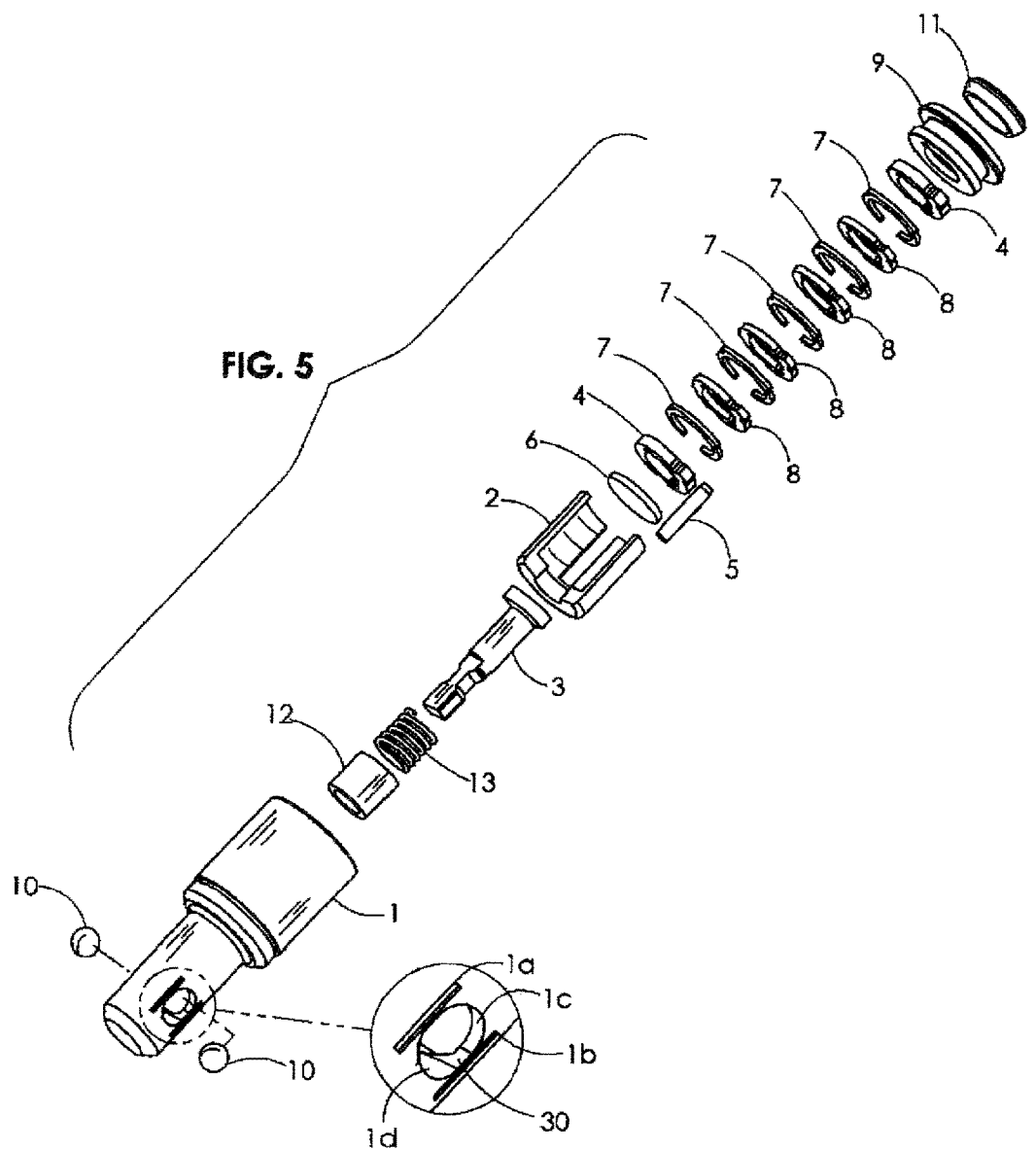
FIG. 5 is an exploded perspective view of a keyless insertion barrel lock in accordance with an embodiment of the present invention.

When the keyless insertion lock is pushed into an aperture, resistance (or reaction forces) from the surfaces or walls creating the aperture, push against balls 10 and, thereby, urge balls 10 longitudinally toward the proximal end of the case and inward toward the case axis. Surface 3*a* prevents recessing. However, when this reaction force overcomes the bias of spring 13, sleeve 12 retracts proximally so that balls 10 move along surfaces 3*a*. At junction of 3*a* and 3*b* along longitudinal movement the in proximal direction, the balls can and do recede toward case axis along surface 3*b*. The balls become fully recessed when contacting 3*c* and, consequently, have no forces driving them further toward the axis. Coincidentally, the balls contact surfaces 1*d* and 3*d* preventing further longitudinal travel. As shown in the figures, cooperative structures are provided to prevent travel; FIGS. 3, 4 & 7 depict the component positions when balls 10 are fully retracted, which enables free passage through an aperture.

Upon exiting the aperture, the bias of spring 13 and absence of outside forces allows the balls 10 to reverse the ravel sequence described above and return to lowest energy position described in FIG. 6.

Pulling the lock back out of an aperture in the locked state is resisted by surfaces 1*c* of slot 30 and 3*a* of rotor 3. Consequently, the locked lock allows entry into an aperture but prevents extraction without unlocking in view of the cooperative configuration and relationship of the locking apparatus components.

Other nonlimiting embodiments as well are contemplated within the present invention. Some possible alternate nonlimiting embodiments include the following, but are not considered exhaustive. In one example embodiment, the compression spring 13 and sleeve 12 could be replaced and in many ways with various structures or different types of materials (flexible plastics, metals, resilient materials, or other suitable materials). For instance, a variable pitch spring could eliminate the need for sleeve 12. Or a leaf spring could be incorporated into the rotor stem 3 so that the rotor stem could perform requisite functions of sleeve 12, spring 13 and rotor stem 3. In another example embodiment, a leaf spring or other biasing mechanism could be incorporated in a sleeve 12. In another example embodiment, an independent compression spring for each ball 10 could be used. In another example embodiment, the biasing arrangement could be provided by an extension or leaf spring pulling the sleeve toward the distal end of the rotor stem. Other example embodiments, can include a single or multiple ball bearings 10 or other components such as, for example, a leaf spring, urethane spring, o-ring.

Another example embodiment provides an apparatus adapted to be mounted to secure at least one enclosure. Other applications include use with a hasp, truck lock, disposable locks or in various environments and industries. In an alternate embodiment, the invention could have an inverted configuration.

In another example embodiment, the sleeve 12 is equivalent to any mechanism that bears upon the balls 10 to urge to desired position of rest. The spring 10 is equivalent to any mechanism that resist motion and biases balls to desired position of rest as described above.

In view of the above and FIGS. 1-20 and also referring to U.S. Pat. No. 4,742,703, and FIG. 62 (see also FIG. 2 in U.S. Pat. No. 4,742,703), another example embodiment is provided as noted below. The reference numerals in FIG. 62 correlate with those as provided in the above-referenced patent but, in other example embodiments of the present invention, the referenced structure may be combined with that shown above in FIGS. 1-20 as noted.

In another example embodiment, when various types of locking hardware may be used comprising a rotation restricting stop surface, wherein the barrel lock comprises: a body comprising a head and a shank connected to said head; at least one rotation restricting stop surface located on said body for interaction with the rotation restricting stop surface of the locking hardware; and at least one variable-radial-play and radially-retractable retainer having an acute retaining surface, wherein the radial play allows the retainer to protrude through said body in a first condition and retract into said body in a second condition.

As to a further discussion of the manner of usage and operation of the present invention and example embodiment herein, the same should be apparent from the description herein.

Referring generally to FIGS. 11-20, example embodiments of the present invention are illustrated. In various example embodiments, the barrel lock may be used with a variety of types of hardware adapted to receive a barrel lock so as to secure a given locking device and may used secure a numerous other types of locking devices or hardware.

In an example embodiment of the invention, the barrel lock is adapted for use with various types of hardware capable of receiving a barrel lock as noted. In one example embodiment, the barrel lock comprises a body, at least one locking member and a biasing member for biasing the locking member into an extended mode. In other example embodiments, a plurality of locking members are provided. When a sufficient external force is applied to the at least one locking member, the locking member moves into a retracted mode, such that at least a portion of the locking member is retracted into the body and such that the barrel lock may be inserted into the hardware (Hardware may be any of various types of structure or devices adapted for receiving a barrel lock. The barrel lock is axially insertable in example embodiments as noted herein).

The following provides a description of an example embodiment of the locking apparatus. The motion of locking members (or ball bearings 110), in this example embodiment, will be described longitudinally along the axis of case 101 as proximal and distal relative to end cap 109; the motion of balls 110 will also be described radially relative to center axis of case 1. Also, in this example embodiment, to "recess", "recede" or "retract" shall refer to travelling toward the case 1 axis and to "extend" shall refer to travelling away from the case 1 axis.

Figure 21:
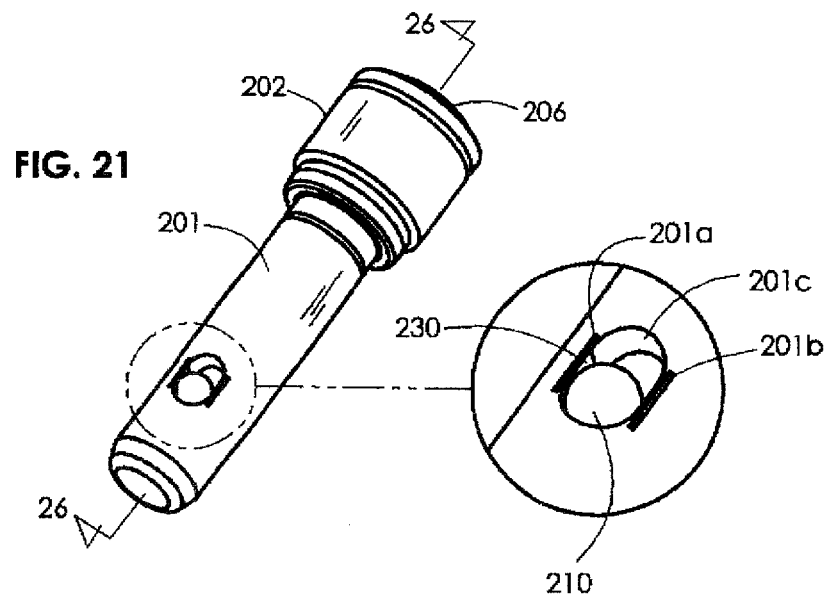
FIG. 21 is a perspective view of a keyless insertion barrel lock in accordance with an embodiment of the present invention. In this view, the locking members (or in this example embodiment, balls 210) are expanded, plunger stem 203 in the locked position and the biasing member extended.
Figure 22:
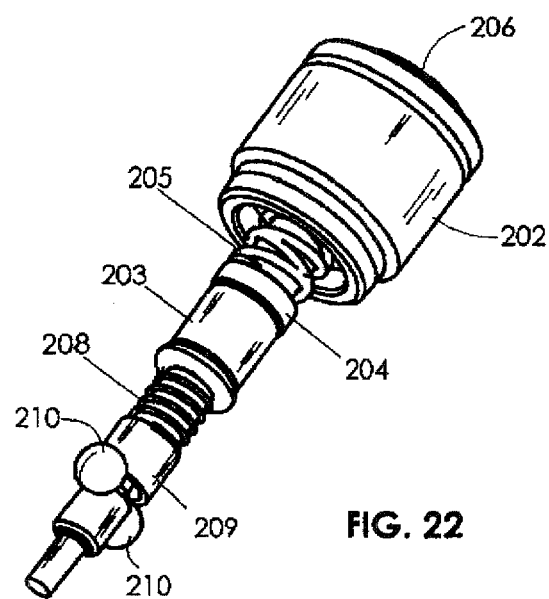
FIG. 22 is the same perspective view as FIG. 21 with case 201 hidden to show internal components.

Referring to FIGS. 21 and 22, the locking assembly is shown with ball bearings 110 extended from inside case 101 through slots 130 on opposing sides of case. Ball position boundaries are partially defined by the following elements of case 101: 101*a*, 101*b*, and slot 130 ends 101*e* and 101*d*. Retaining protuberances 101*a* and 101*b* restrain the balls within the lock assembly and present a physical boundary within which balls can recede toward or extend from the case center axis in an example embodiment. The ball bearings (e.g., 10) track within the respective slots longitudinally parallel with the case center axis and are bound by slot 130 ends 101*c* and 101*d*.

The positioning of balls 110 is further constrained by the geometry of rotor stem 3. Referring to FIG. 8, rotor stem 103 has four surfaces (103*a*, 103*b*, 103*c*, and 103*d*) controlling the position and movement (and behavior) of balls 110. Surface 3*c* defines the boundary of recessing travel of the balls 110 so that the balls can recede toward access no further than surface 103*c*. Surface 103*d* in cooperation with surface 101*d* of slot 130 defines the boundary of proximal longitudinal travel of ball 110. Surface 103*a* presents a hard bearing surface and interference with the ball movement that prevents the balls from recessing.

Figure 16:
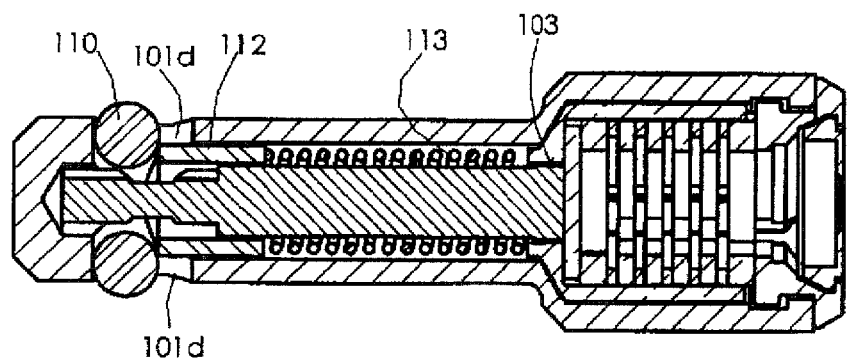
FIG. 16 is a cross-sectional view of a keyless insertion barrel lock in accordance with an embodiment of the present invention. In this view, the lock assembly balls 110 are expanded, rotor stem 103 in the locked position and the biasing member extended.

Referring to FIG. 16, the balls 110 are shown at the most extended state. The balls are constrained by surface 103*a*, surface 101*c* of slot 130 and retaining protuberances 101*a* and 101*b*. At this most extended state, the spherical center of balls 110 remains within the lock case 101. Consequently, any effort to push the lock into and through an aperture would generate (or render) forces both proximally longitudinal and radial toward center.

Figure 19:
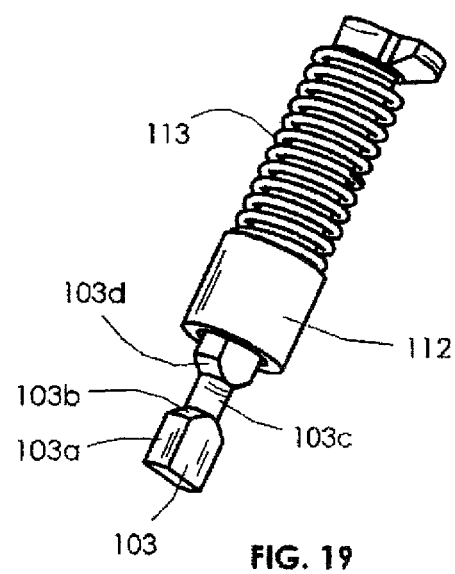
FIG. 19 is a perspective view of the rotor stem with biasing mean of the keyless insertion barrel lock.
Figure 20A:
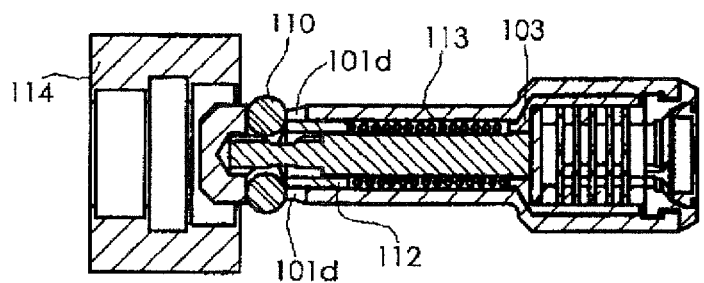
FIGS. 20a, 20b, 20c, 20d and 20e are cross-sectional views of a keyless insertion barrel lock in accordance with an embodiment of the present invention. In this view, the lock is advanced to enter multiple apertures in receiving hardware which illustrates functional operation in one example embodiment.
Figure 20B:
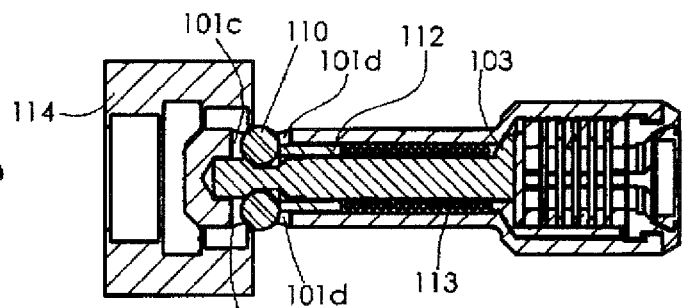
Figure 20C:
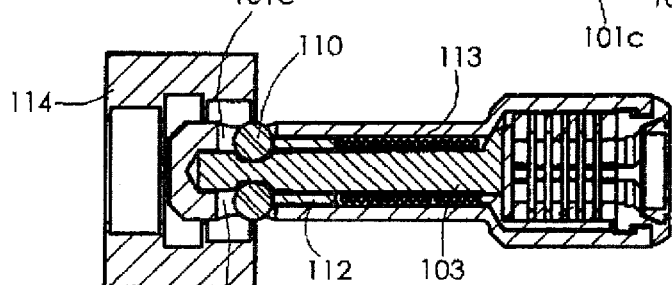
Figure 20D:
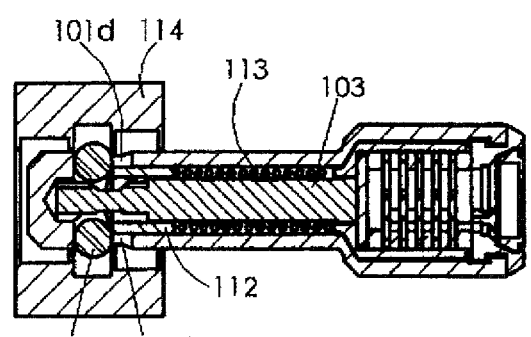
Figure 20E:
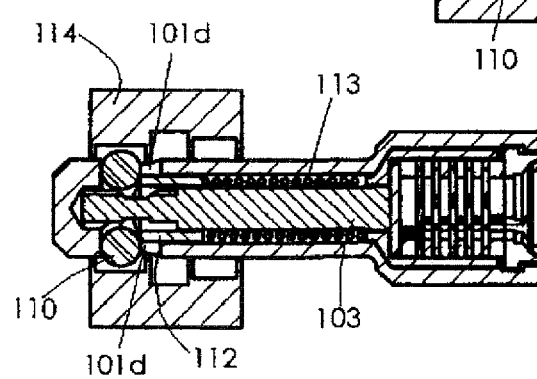

Referring to FIGS. 16 and 19, sleeve 112 and compression spring 113 cooperatively biases balls 110 toward surface 101c of slot 130. Sleeve 112 bears on balls 110. Compression spring 113 permits translation of the sleeve along the case axis and biases toward a rest position at the most extended position or state as described in FIGS. 101, 102 and 106.

Figure 13:
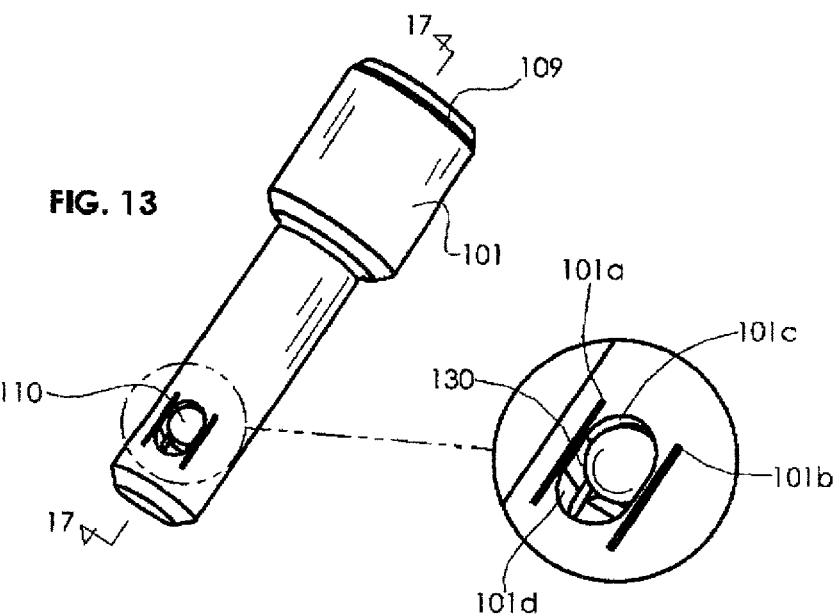
FIG. 13 is a perspective view of a keyless insertion barrel lock in accordance with an embodiment of the present invention. In this view, the lock assembly balls 110 are recessed, rotor stem 103 in the locked position and the biasing member retracted.
Figure 14:
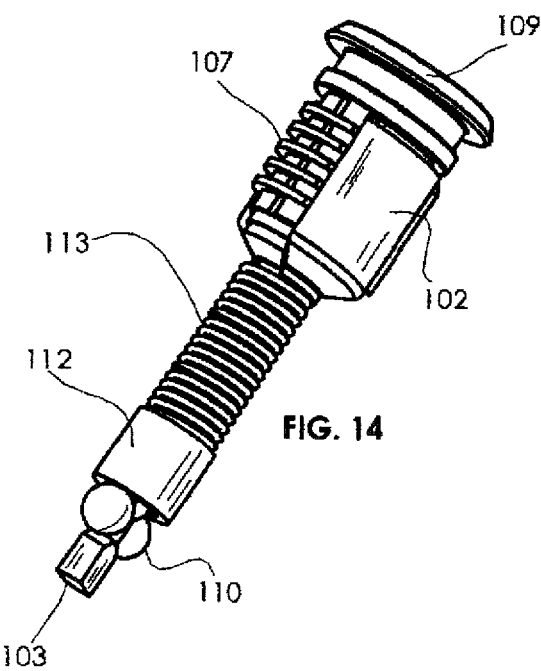
FIG. 14 is the same perspective view as FIG. 13 with case 101 hidden to show internal components.
Figure 15:
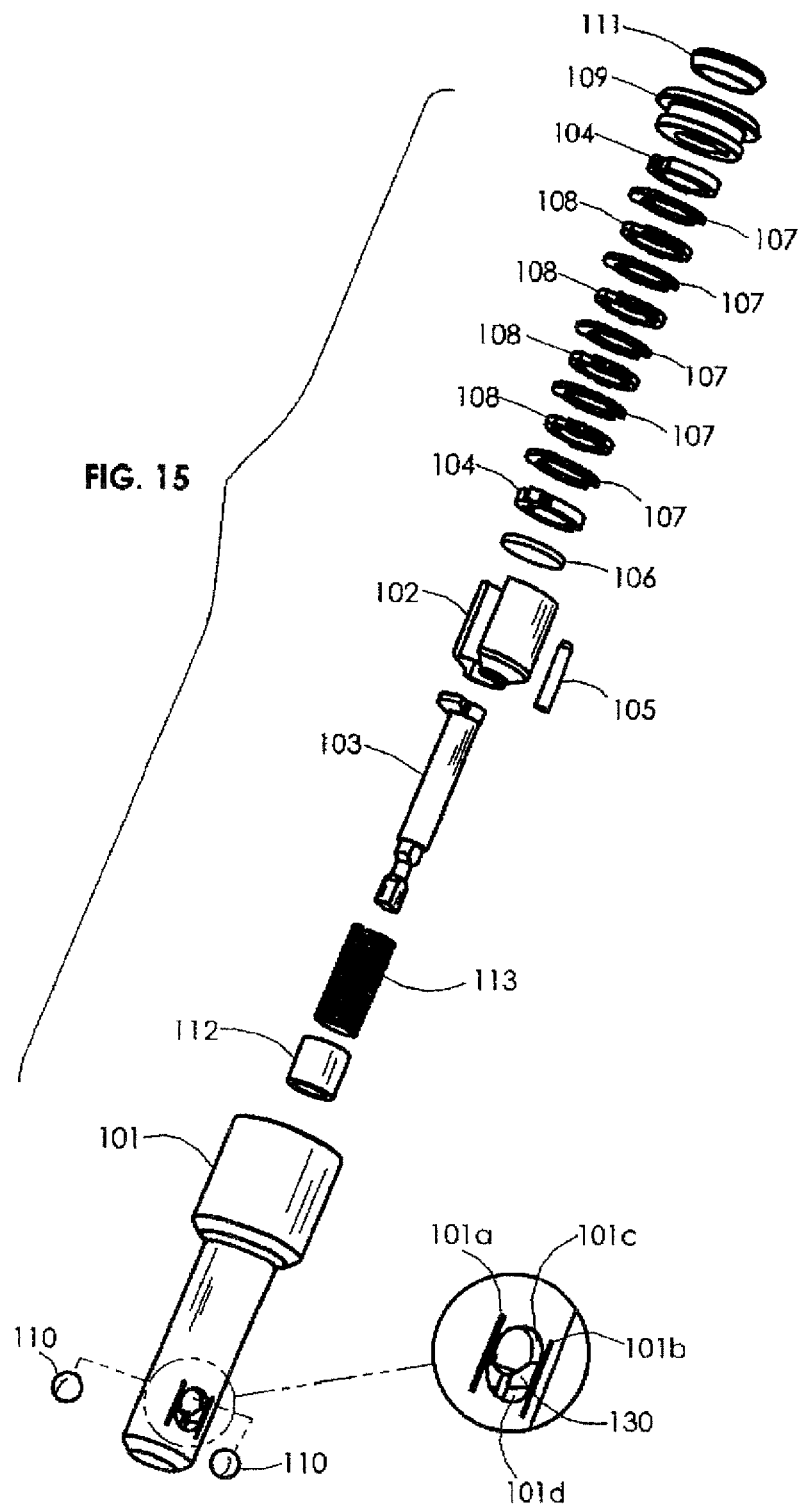
FIG. 15 is an exploded perspective view of a keyless insertion barrel lock in accordance with an embodiment of the present invention.
Figure 17:
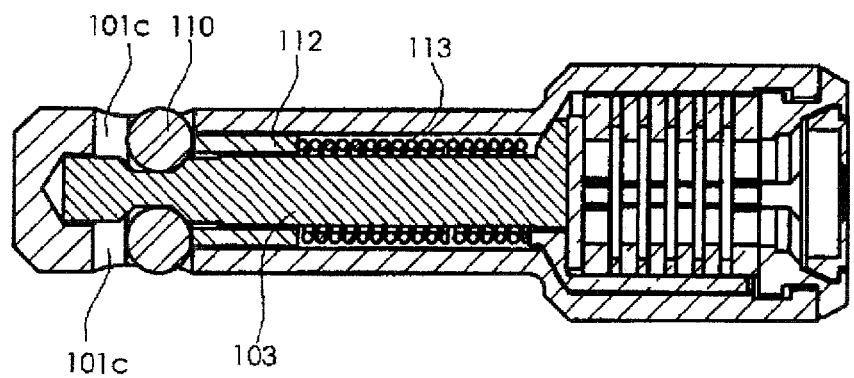
FIG. 17 is a cross-sectional view of a keyless insertion barrel lock in accordance with an embodiment of the present invention. In this view, the lock assembly balls 110 are recessed, rotor stem 103 in the locked position and the biasing member retracted.

When the keyless insertion lock is pushed into an aperture, resistance (or reaction forces) from the surfaces or walls creating the aperture, push against balls 110 and, thereby, urge balls 110 longitudinally toward the proximal end of the case and inward toward the case axis. Surface 103a prevents recessing. However, when this reaction force overcomes the bias of spring 113, sleeve 112 retracts proximally so that balls 110 move along surfaces 103a. At junction of 103a and 103b along longitudinal movement the in proximal direction, the balls can and do recede toward case axis along surface 103b. The balls become fully recessed when contacting 103c and, consequently, have no forces driving them further toward the axis. Coincidentally, the balls contact surfaces 101d and 103d preventing further longitudinal travel. As shown in the figures, cooperative structures are provided to prevent travel; FIGS. 13, 14 & 17 depict the component positions when balls 110 are fully retracted, which enables free passage through an aperture.

Upon exiting the aperture, the bias of spring 113 and absence of outside forces allows the balls 110 to reverse the ravel sequence described above and return to lowest energy position described in FIG. 6.

Pulling the lock back out of an aperture in the locked state is resisted by surfaces 101c of slot 130 and 103a of rotor 103. Consequently, the locked lock allows entry into an aperture but prevents extraction without unlocking in view of the cooperative configuration and relationship of the locking apparatus components.

Other nonlimiting embodiments as well are contemplated within the present invention. Some possible alternate nonlimiting embodiments include the following, but are not considered exhaustive. In one example embodiment, the compression spring 113 and sleeve 112 could be replaced and in many ways with various structures or different types of materials (flexible plastics, metals, resilient materials, or other suitable materials). For instance, a variable pitch spring could eliminate the need for sleeve 112. Or a leaf spring could be incorporated into the rotor stem 113 so that the rotor stem could perform requisite functions of sleeve 112, spring 113 and rotor stem 113. In another example embodiment, a leaf spring or other biasing mechanism could be incorporated in a sleeve 112. In another example embodiment, an independent compression spring for each ball 110 could be used. In another example embodiment, the biasing arrangement could be provided by an extension or leaf spring pulling the sleeve toward the distal end of the rotor stem. Other example embodiments, can include a single or multiple ball bearings 10 or other components such as, for example, a leaf spring, urethane spring, o-ring.

Referring generally to FIGS. 21-30, example embodiments of the present invention are illustrated. In various example embodiments, the barrel lock may be used with a variety of types of hardware adapted to receive a barrel lock so as to secure a given locking device and may used secure a numerous other types of locking devices or hardware.

In an example embodiment of the invention, the barrel lock is adapted for use with various types of hardware capable of receiving a barrel lock as noted. In one example embodiment, the barrel lock comprises a body, at least one locking member and a biasing member for biasing the locking member into an extended mode. In other example embodiments, a plurality of locking members are provided. When a sufficient external force is applied to the at least one locking member, the locking member moves into a retracted mode, such that at least a portion of the locking member is retracted into the body and such that the barrel lock may be inserted into the hardware (Hardware may be any of various types of structure or devices adapted for receiving a barrel lock. The barrel lock is axially insertable in example embodiments as noted herein).

The following provides a description of an example embodiment of the locking apparatus. The motion of locking members (or ball bearings 210), in this example embodiment, will be described longitudinally along the axis of case 201 as proximal and distal relative to end cap 202; the motion of balls 210 will also be described radially relative to center axis of case 201. Also, in this example embodiment, to "recess", "recede" or "retract" shall refer to travelling toward the case 1 axis and to "extend" shall refer to travelling away from the case 201 axis.

Referring to FIGS. 21 and 22, the locking assembly is shown with ball bearings 210 extended from inside case 201 through slots 230 on opposing sides of case. Ball position boundaries are partially defined by the following elements of case 201: 201a, 201b, and slot 230 ends 201c and 201d. Retaining protuberances 201a and 201b restrain the balls within the lock assembly and present a physical boundary within which balls can recede toward or extend from the case center axis in an example embodiment. The ball bearings (e.g., 210) track within the respective slots longitudinally parallel with the case center axis and are bound by slot 230 ends 201c and 201d.

Figure 28A:
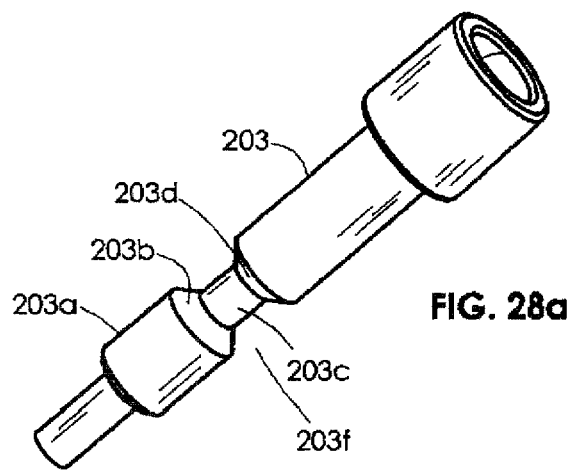
FIG. 28a is a perspective view of plunger stem of the keyless insertion barrel lock.
Figure 28B:
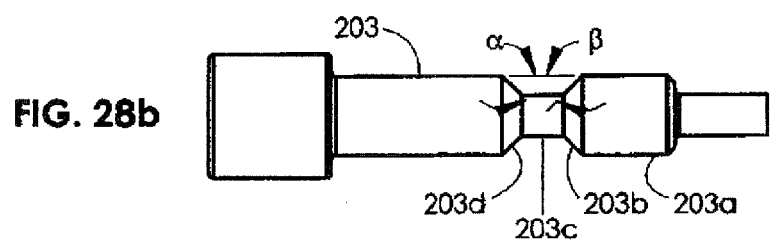
FIG. 28b is a perspective view of plunger stem of the keyless insertion barrel lock.

The positioning of balls 210 is further constrained by the geometry of plunger stem 3. Referring to FIG. 28, plunger stem 203 has four surfaces (203a, 203b, 203c, and 203d) controlling the position and movement (and behavior) of balls 10. Surface 3c defines the boundary of recessing travel of the balls 210 so that the balls can recede toward access no further than surface 203c. Surface 203d in cooperation with surface 201d of slot 230 defines the boundary of proximal longitudinal travel of ball 210. Surface 203a presents a hard bearing surface and interference with the ball movement that prevents the balls from recessing.

Referring to FIG. 26, the balls 210 are shown at the most extended state. The balls are constrained by surface 203a, surface 201c of slot 230 and retaining protuberances 201a and 201b. At this most extended state, the spherical center of balls 210 remains within the lock case 201. Consequently, any effort to push the lock into and through an aperture would generate (or render) forces both proximally longitudinal and radial toward center.

Figure 29:
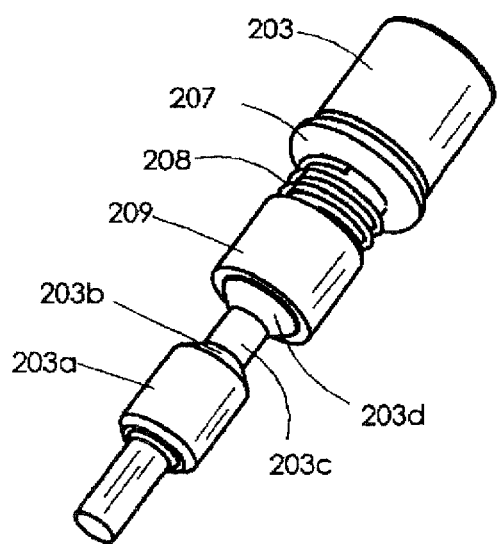
FIG. 29 is a perspective view of the plunger stem with biasing mean of the keyless insertion barrel lock.
Figure 30A:
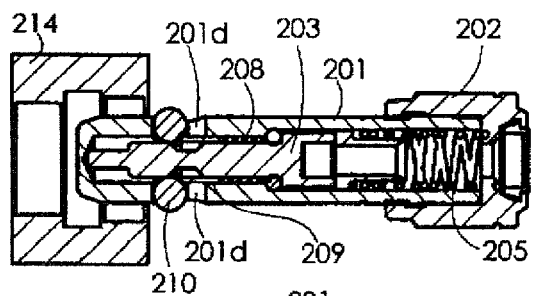
FIGS. 30a, 30b, 30c, 30d and 30e are cross-sectional views of a keyless insertion barrel lock in accordance with an embodiment of the present invention. In this view, the lock is advanced to enter multiple apertures in receiving hardware which illustrates functional operation in one example embodiment.
Figure 30B:
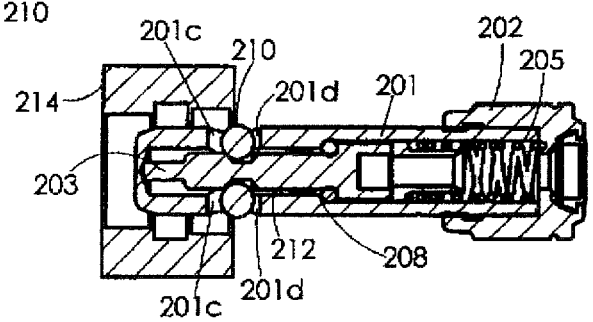
Figure 30C:
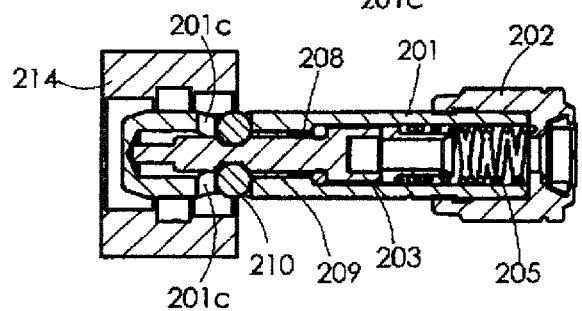
Figure 30D:
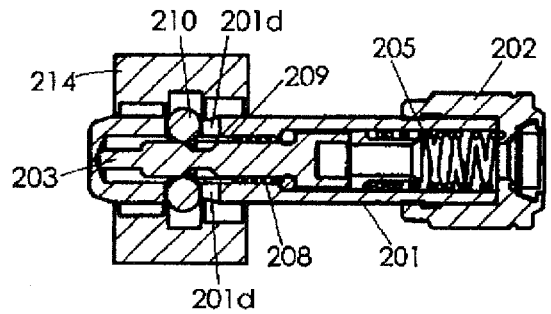
Figure 30E:
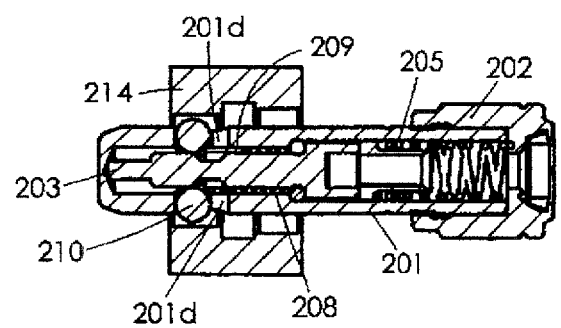

Referring to FIGS. 26 and 29, sleeve 212 and compression spring 213 cooperatively biases balls 210 toward surface 201c of slot 230. Sleeve 212 bears on balls 210. Compression spring 213 permits translation of the sleeve along the case axis and biases toward a rest position at the most extended position or state as described in FIGS. 21, 22 and 26.

Figure 23:
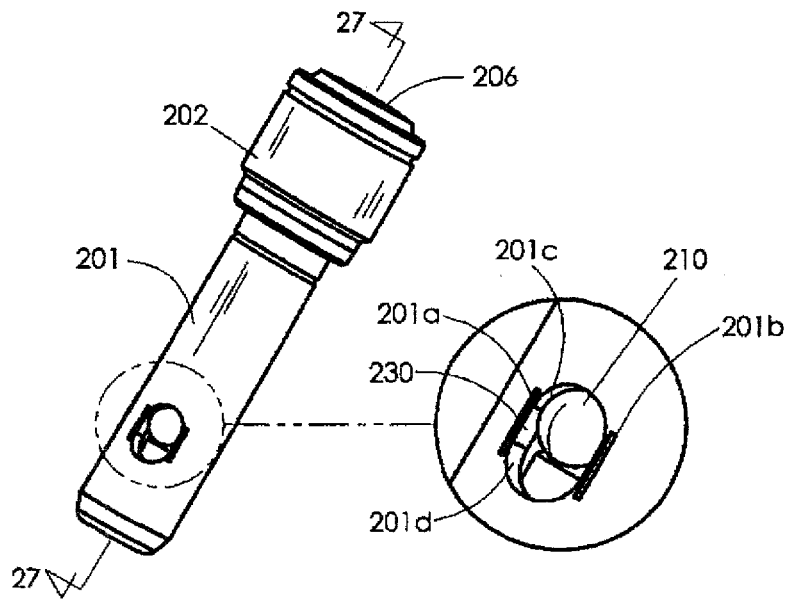
FIG. 23 is a perspective view of a keyless insertion barrel lock in accordance with an embodiment of the present invention. In this view, the lock assembly balls 210 are recessed, plunger stem 203 in the locked position and the biasing member retracted.
Figure 24:
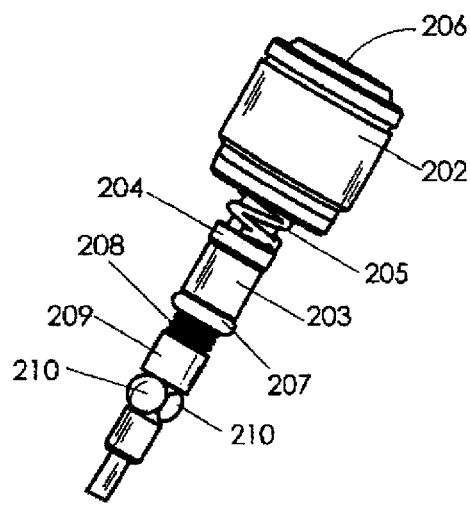
FIG. 24 is the same perspective view as FIG. 23 with case 201 hidden to show internal components.
Figure 25:
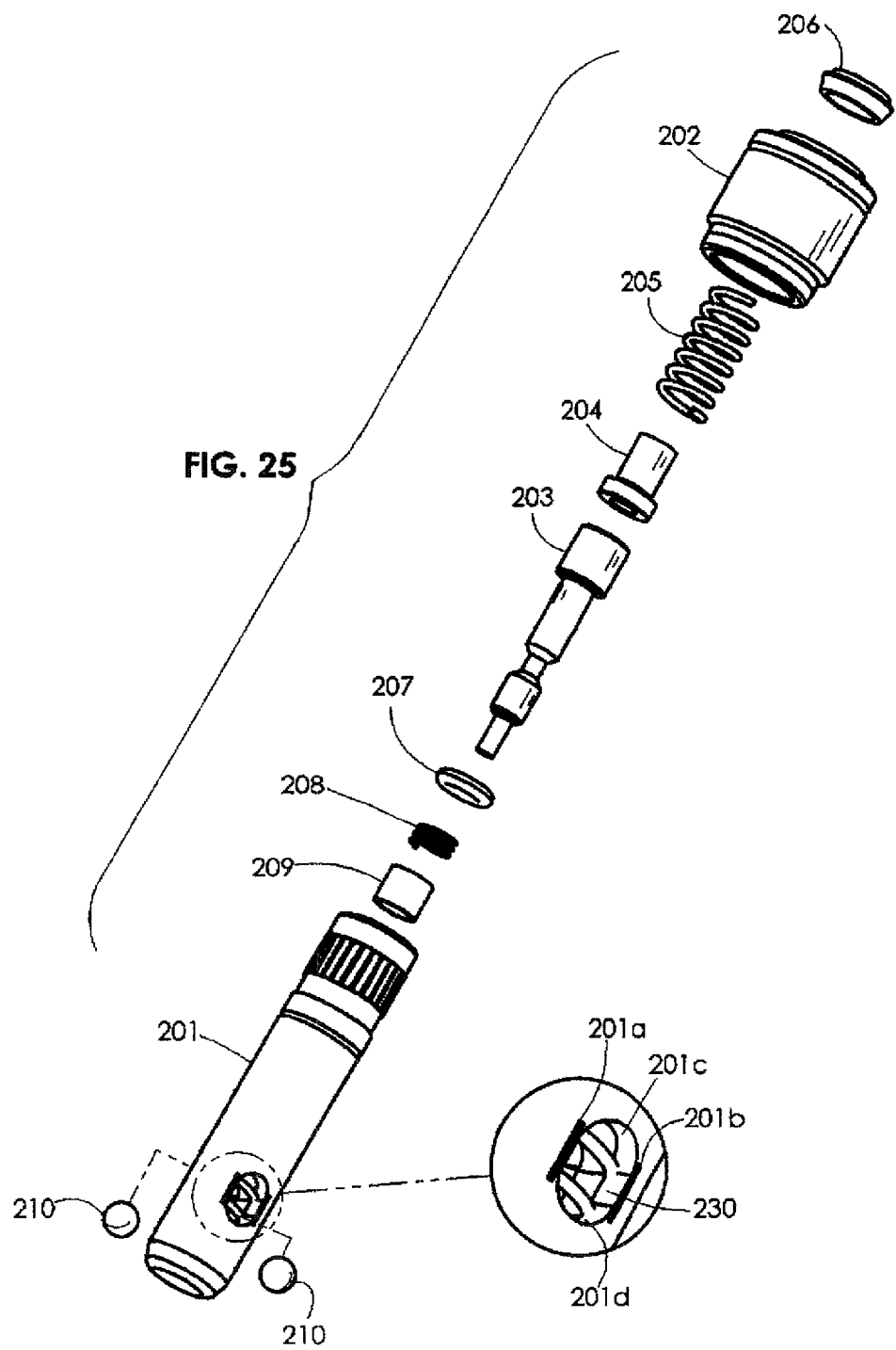
FIG. 25 is an exploded perspective view of a keyless insertion barrel lock in accordance with an embodiment of the present invention.

When the keyless insertion lock is pushed into an aperture, resistance (or reaction forces) from the surfaces or walls creating the aperture, push against balls 210 and, thereby, urge balls 210 longitudinally toward the proximal end of the case and inward toward the case axis. Surface 203a prevents recessing. However, when this reaction force overcomes the bias of spring 213, sleeve 212 retracts proximally so that balls 210 move along surfaces 203a. At junction of 203a and 203b along longitudinal movement the in proximal direction, the balls can and do recede toward case axis along surface 203b. The balls become fully recessed when contacting 3c and, consequently, have no forces driving them further toward the axis. Coincidentally, the balls contact surfaces 201d and 203d preventing further longitudinal travel. As shown in the figures, cooperative structures are provided to prevent travel; FIGS. 23, 24 & 27 depict the component positions when balls 210 are fully retracted, which enables free passage through an aperture.

Upon exiting the aperture, the bias of spring 213 and absence of outside forces allows the balls 210 to reverse the ravel sequence described above and return to lowest energy position described in FIG. 26.

Pulling the lock back out of an aperture in the locked state is resisted by surfaces 201c of slot 230 and 203a of plunger stem 203. Consequently, the locked lock allows entry into an aperture but prevents extraction without unlocking in view of the cooperative configuration and relationship of the locking apparatus components.

Other nonlimiting embodiments as well are contemplated within the present invention. Some possible alternate non-limiting embodiments include the following, but are not considered exhaustive. In one example embodiment, the compression spring 213 and sleeve 212 could be replaced and in many ways with various structures or different types of materials (flexible plastics, metals, resilient materials, or other suitable materials). For instance, a variable pitch spring could eliminate the need for sleeve 212. Or a leaf spring could be incorporated into the plunger stem 203 so that the plunger stem could perform requisite functions of sleeve 212, spring 213 and plunger stem 203. In another example embodiment, a leaf spring or other biasing mechanism could be incorporated in a sleeve 212. In another example embodiment, an independent compression spring for each ball 210 could be used. In another example embodiment, the biasing arrangement could be provided by an extension or leaf spring pulling the sleeve toward the distal end of the plunger stem. Other example embodiments, can include a single or multiple ball bearings 210 or other components such as, for example, a leaf spring, urethane spring, o-ring.

Figure 8B:
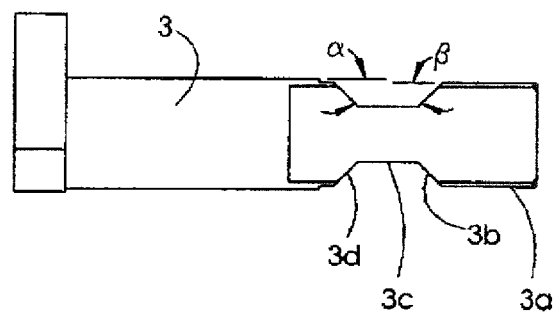
FIG. 8b is a perspective view of rotor stem of the keyless insertion barrel lock.
Figure 18A:
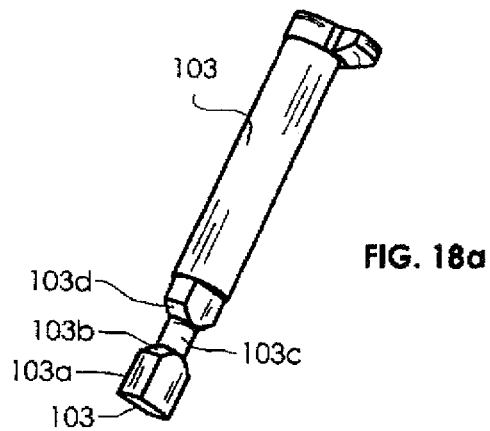
FIG. 18a is a perspective view of rotor stem of the keyless insertion barrel lock.
Figure 18B:
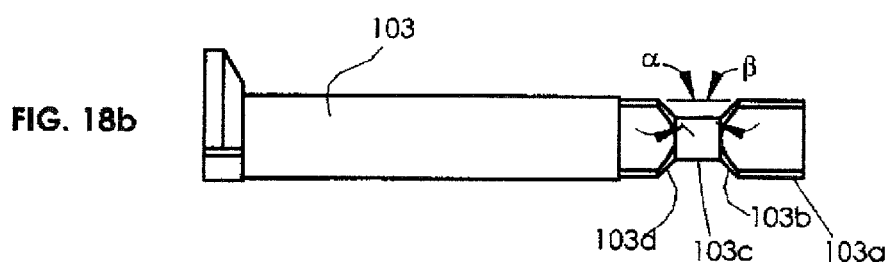
FIG. 18b is a perspective view of rotor stem of the keyless insertion barrel lock.

Referring to FIGS. 8b, 18b and 28c, and regarding the uni-directional, one way pass through features, anti-retraction interface geometry, in non-limiting example embodiments, the geometry of rotor stems 3, 103 and plunger stem 203 defines the one-way-pass-through behavior of the ball bearings during keyless insertion that enables uni-directional travel of ball bearings and anti-retraction of lock. When in the locked state surface a resists the balls from receding into the case and ensures anti-retraction of lock. When lock is pushed into a stationary aperture of sufficient size to allow entry of case while contacting ball bearings and with sufficient force to overcome biasing means, the reactionary forces of the aperture wall push the balls proximally toward surface d. Because the geometric center of the ball bearing remains always within the case, the aperture walls exerts a reaction force to the balls that is necessarily tangential; thus, the balls are also pushed inward toward the center axis of rotor stem. As the lock enters the aperture in a keyless operation, the balls travel proximally along surface a until reaching surface b when it also begins to descend along a slope defined by angle β. Angle β is 45 degrees in this embodiment and could vary significantly and remain operable but would require changes to other components. The smaller the angle the longer slot 30, 130 and 230 must become and shorter is preferable for multiple reasons: strength of case body reduces as hole increases in size, the biasing mechanism must accommodate longer travel which may cause complications and importantly the lock shaft would have to increase in length which would make it incompatible with existing locking devices. Angle β could increase by 20 degrees and function, but the rotor stem would be weaker and the lock assembly would require a stronger biasing means to push the balls up the steeper slope. As the lock continues to enter the aperture in a keyless operation, the balls travel down slope b until reaching surface c, where the ball is fully recessed within the case at which point it is also in contact with surface d defined by angle α. Angle α is 45 degrees in this embodiment and could vary significantly and remain operable, but would require changes to other components. A larger a would require extending the length of surface c and would weaken the rotor stem. A smaller α would not require any change but would also offer no benefit.

Note that each of the following, as well as the foregoing, provide non-limiting example embodiments or the invention: The following discussion describes alternate embodiments of the means of urging the balls into the locked position and allowing the balls to recede into the case during a keyless insertion. The FIGS. 1-30 describe example embodiments, and further, non-limiting example embodiments are provided as follows, as indicated. Variations of the following can be applied to each example embodiment or alternatives.

Figure 31:
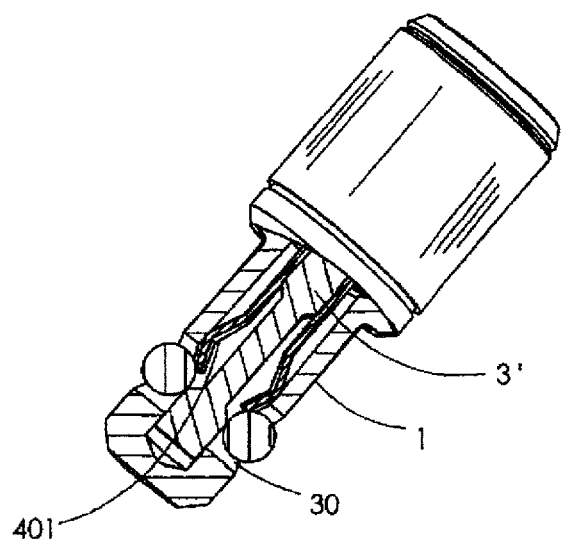
FIG. 31 is a perspective view of a keyless insertion barrel lock with a single piece biasing member made either of stamped metal or formed plastic acting on lock assembly balls in accord with one possible embodiment of the invention.
Figure 32:
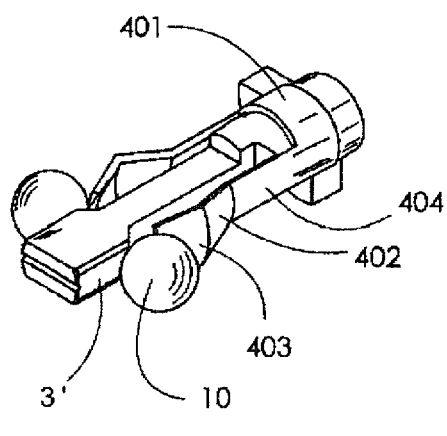
FIG. 32 is perspective view of a subassembly from FIG. 31.
Figure 33:
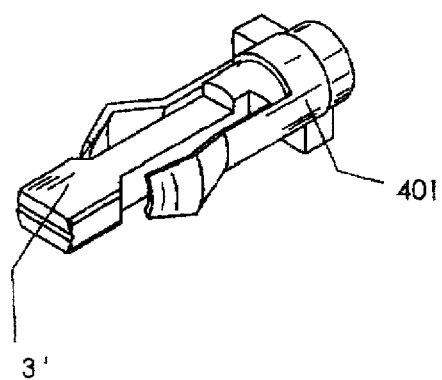
FIG. 33 is perspective view of a subassembly from FIG. 31.
Figure 34:
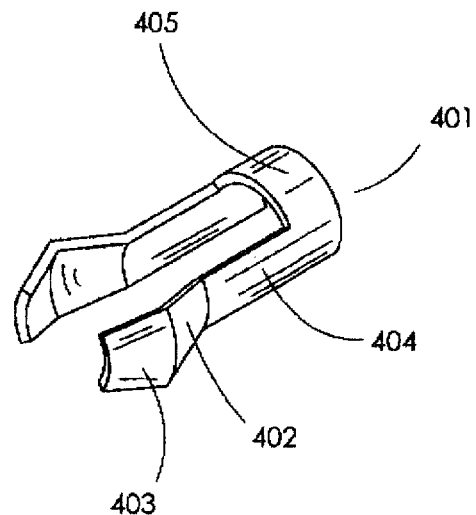
FIG. 34 is a perspective view of a single piece biasing member from FIG. 31.
Figure 35:
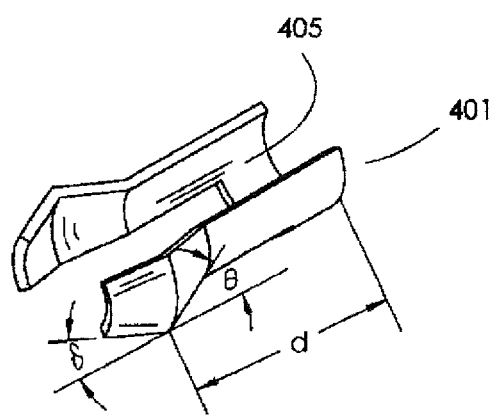
FIG. 35 is a perspective view of a single piece biasing member from FIG. 31.

Another example embodiment below refers to the following figures: FIG. 31 is a perspective view of a keyless insertion lock with partial section cut-away showing alternate biasing means leaf spring 401 and rotor stem 3'; FIG. 32 is a perspective view of rotor stem 3' with biasing means 401 and ball bearings 10; FIG. 33 is a perspective view of rotor stem 3' with biasing means 401; FIG. 34 is a perspective view of biasing means 401; FIG. 35 is another perspective view of biasing means 401. As illustrated, a stamped leaf spring design is provided wherein the keyless insertion lock replaces a biasing means provided by bushing 12 or 112 and spring 13 or 113 with a single leaf spring 401. Component 401 as presented is formed from flat stock spring stainless steel. In other embodiments, the component could also be formed from spring wire. Different materials with sufficient elasticity could be used. The simple design of this spring offers economic opportunity in the price sensitive market of the product. The base band 405 attaches to the rotor stem. An embossment on the case interferes with rotational movement about longitudinal axis of rotor stem and case to ensure positional alignment with slots 30. When balls are forced into recess during keyless insertion, the leaf springs deflect to allow necessary travel of balls along path defined by rotor stem and case as described above. Rotor stem 3' is an alternate embodiment of rotor stem 3 or 13 that is modified to provide movement space for deflecting spring. The shape of deflecting members 402 and 403 defined by angles δ and θ provides the necessary biasing both distally and outwardly. These angles can range from 20 to 60 degrees. The angles and the position of the bend defined by variable "d" are interdependent. Multiple variable value combinations will provide effective forceful contact to ball bearings that will bias ball bearings to locked position while enabling recess and travel necessary for keyless insertion.

Figure 36:
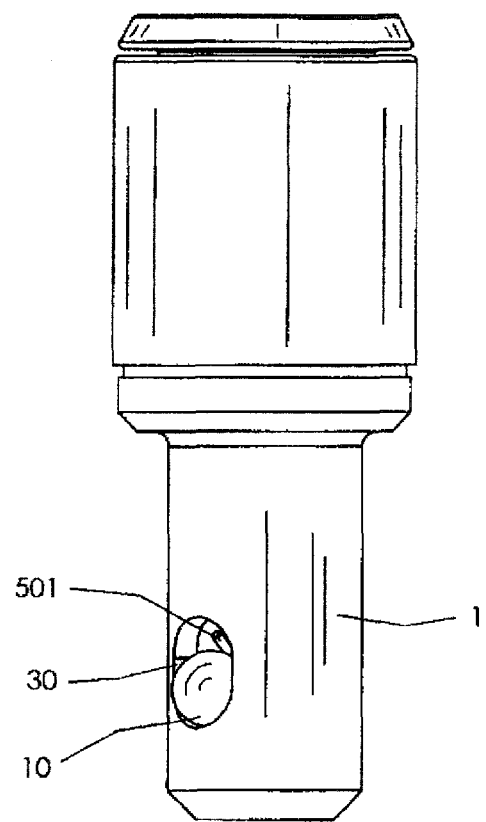
FIG. 36 is a perspective view of a keyless insertion barrel lock with a single piece biasing member and alternate rotor stem in accord with one possible embodiment of the invention.
Figure 37:
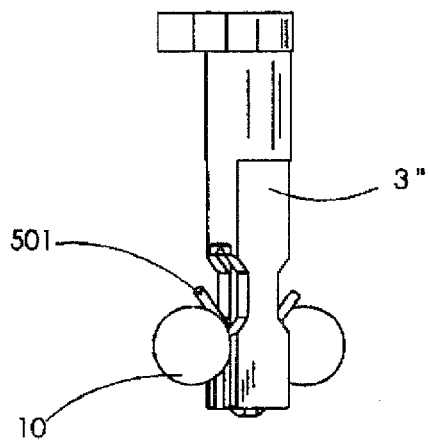
FIG. 37 is perspective view of a subassembly from FIG. 36.
Figure 38:
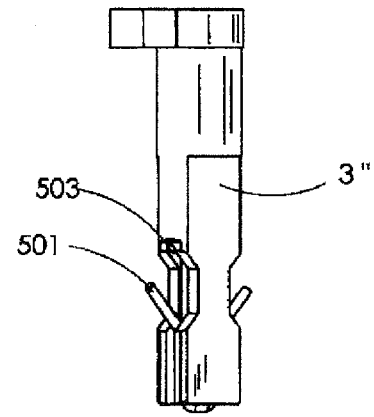
FIG. 38 is perspective view of a subassembly from FIG. 36.
Figure 39:
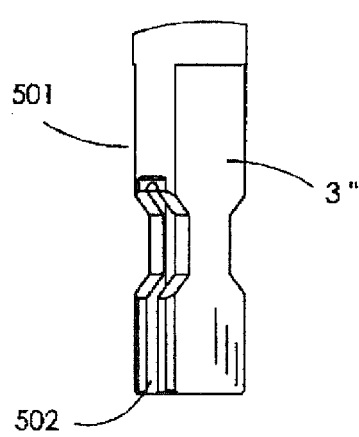
FIG. 39 is a perspective view of alternate rotor stem from FIG. 36.
Figure 40:
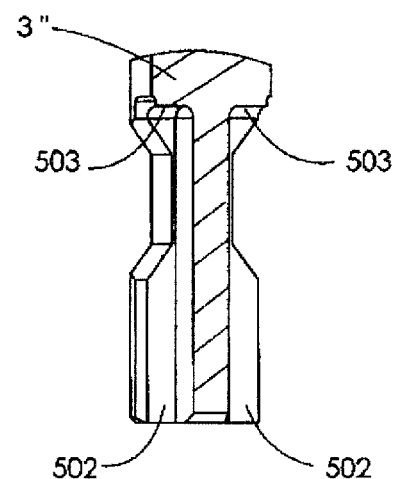
FIG. 40 is a perspective view of alternate rotor stem from FIG. 36.
Figure 41:
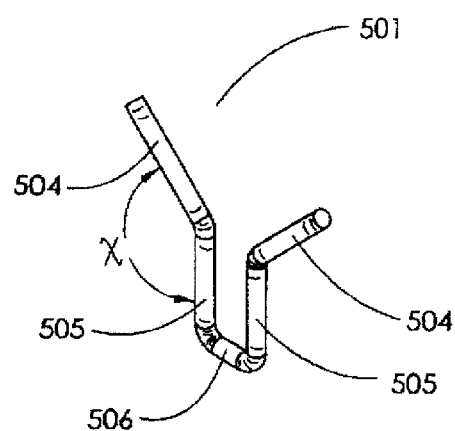
FIG. 41 is a perspective view of single piece biasing member from FIG. 36.

Another example embodiment below refers to the following figures: FIG. 36 is a perspective view of a barrel lock in the locked condition in accordance with multiple embodiments of the present invention. In this view, the locked assembly balls 10 are extended with biasing means 501 visible through slot 30 in case 1. FIG. 37 is a perspective view of rotor stem 3" of keyless insertion barrel lock with biasing means 501 and ball bearings 10 in the locked position. FIG. 38 is a perspective view of the rotor stem 3" of keyless insertion barrel lock with biasing means. FIG. 39 is a perspective view of the distal end of rotor stem 3" of keyless insertion barrel lock. FIG. 40 is a sectional perspective view of the distal end of rotor stem 3" of keyless insertion barrel lock. FIG. 41 is a perspective view of biasing means 501. As illustrated, a wire leaf spring design is provided wherein a keyless insertion lock replaces biasing means provided by bushing 12 or 112 and spring 13 or 113 with a single leaf spring 501. In this embodiment, 501 is a formed spring wire; however, a functional equivalent could be formed from flat steel stock. In both cases, the component 501 is made of stainless spring steel though other material could be used. The simple design of this spring offers economic opportunity in the price sensitive market of the product. In the locked state, the ball bearings 10 are biased by segment 504 to the extended and distal position within slot 30. During keyless insertion the ball bearings 10 are fully recessed and move proximally within the lock case 1, the leaf spring 501 is compressed into the rotor stem 3" reliefs 502 to allow full travel of the balls 10. In the compressed state, the deflecting ends 504 move into recess that ends at 503. Recess 502 also holds the biasing means in proper orientation relative to rotor stem 3". The members 505 are formed to remain within 502 and deliver holding force to retain position and attachment to rotor stem 3". Member 506 in cooperation with the distal end of rotor stem 3" prevents longitudinal travel of 501 in the proximal direction along the rotor stem 3". Angle $\chi$ is 45 degrees in this embodiment but could be implemented in a range of 15 to 75 degrees.

Figure 42:
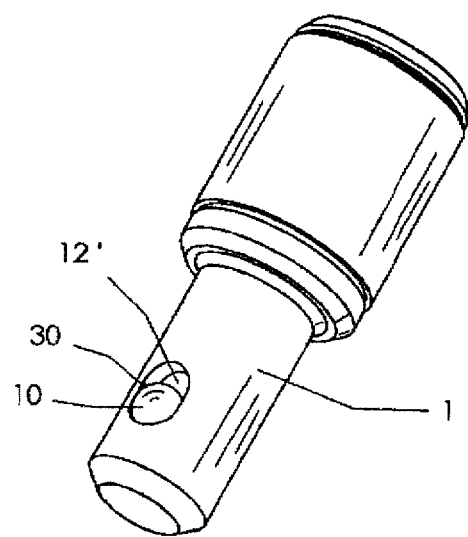
FIG. 42 is a perspective view of a keyless insertion barrel lock with an alternate sleeve in accord with one possible embodiment of the invention.

Another example embodiment below refers to the following figures: FIG. 42 is a perspective view of distal end of a barrel lock in the locked condition in accordance with multiple embodiments of the present invention. In this view, the locked assembly balls 10 are extended with bushing 12' visible through slot 30 in case 1.

Figure 43:
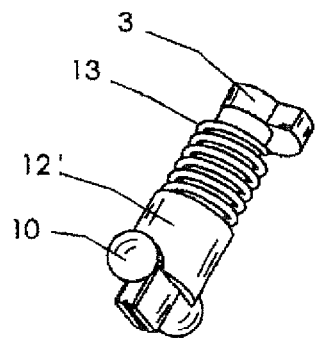
FIG. 43 is perspective view of a subassembly from FIG. 32.

FIG. 43 is a perspective view of rotor stem of keyless insertion barrel lock with biasing means and ball bearings in the locked position.

Figure 44:
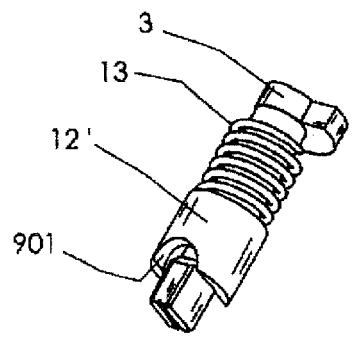
FIG. 44 is perspective view of a subassembly from FIG. 32.
Figure 45:
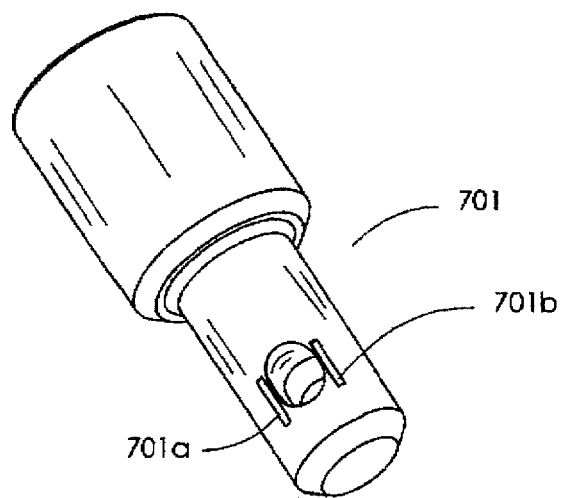
FIG. 45 is a perspective view of a lock case in accord with one possible embodiment of the invention.
Figure 46:
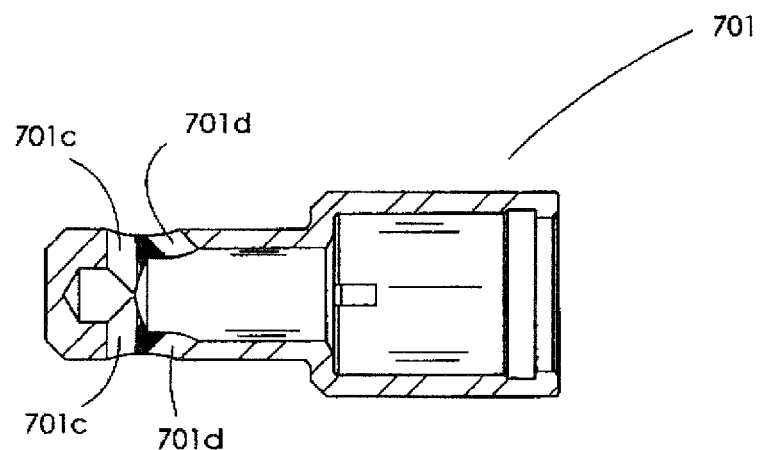
FIG. 46 is a cross sectional view of lock case from FIG. 45.
Figure 47:
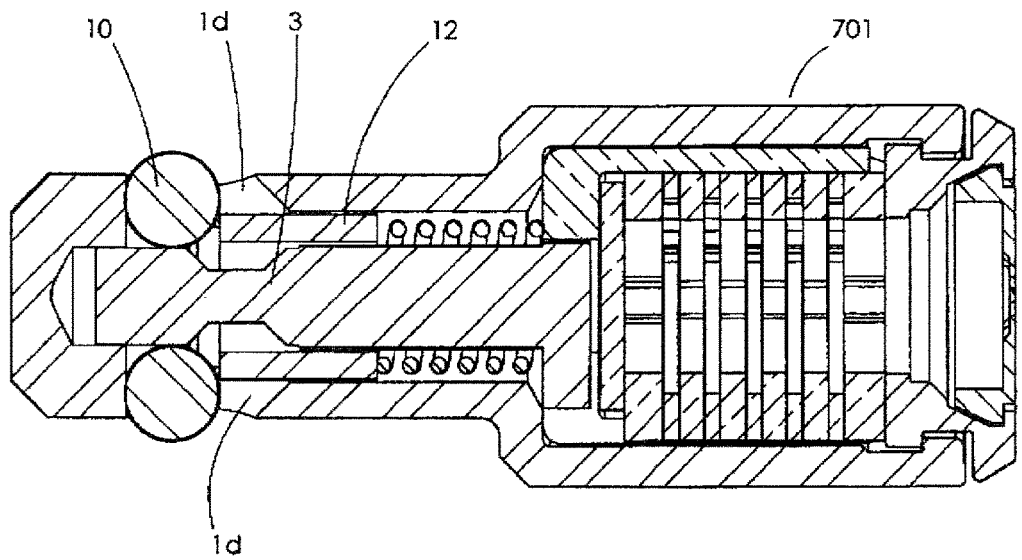
FIG. 47 is a cross sectional view of a keyless insertion lock assembly utilizing lock case from FIG. 45.
Figure 48:
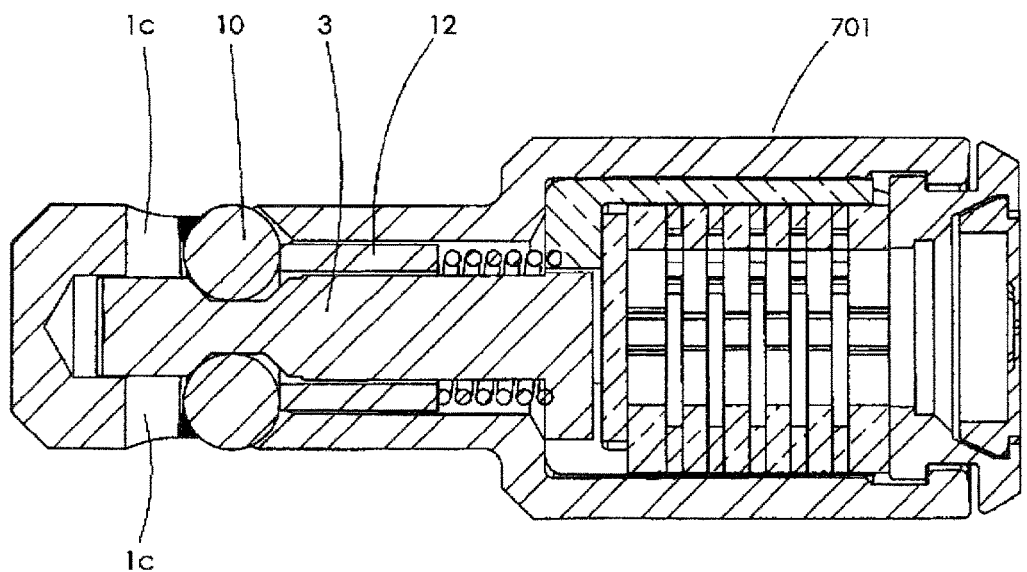
FIG. 48 is a cross sectional view of a keyless insertion lock assembly utilizing lock case from FIG. 45.
Figure 49:
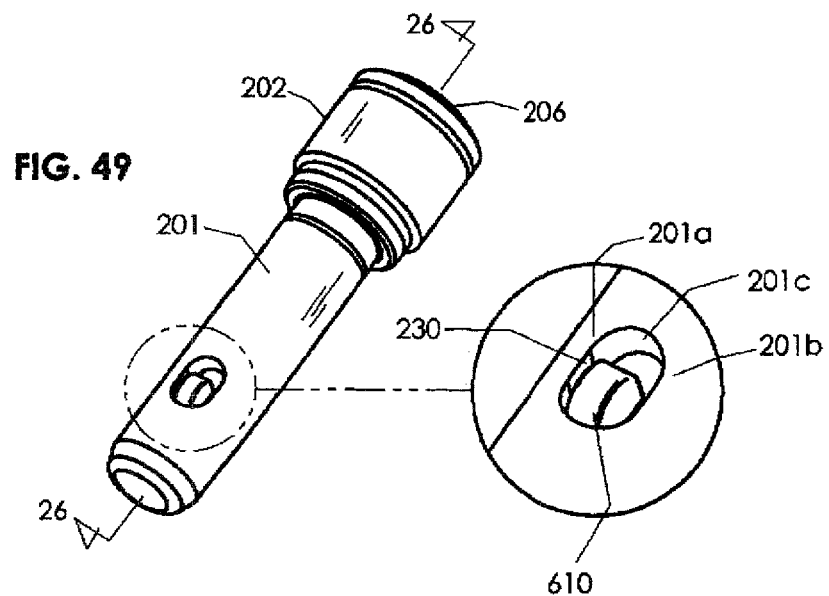
FIG. 49 is a perspective view of a keyless insertion lock with alternate locking means in accord with one possible embodiment of the invention.
Figure 50:
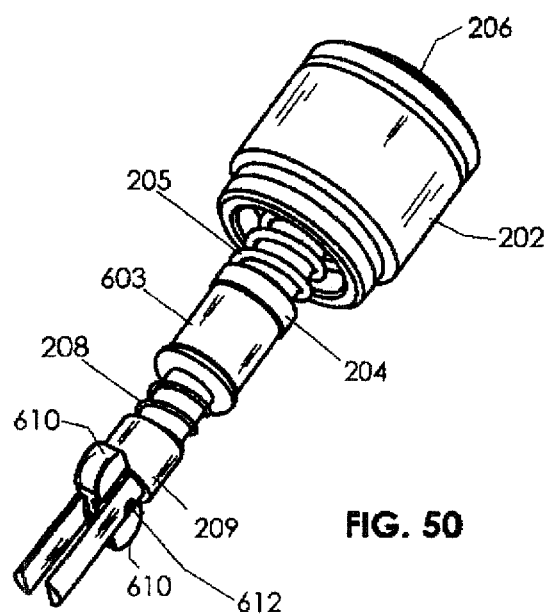
FIG. 50 is a perspective view of a subassembly from FIG. 49.
Figure 51:
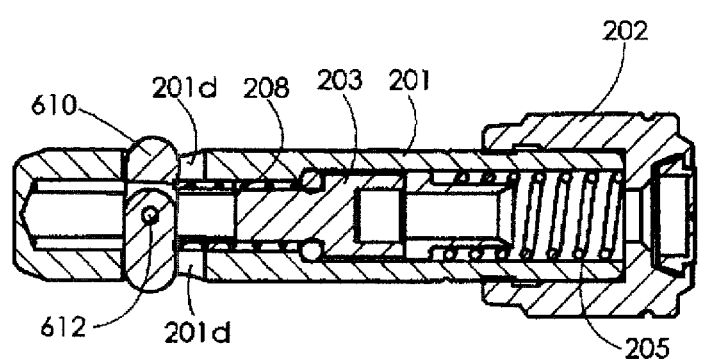
FIG. 51 is a cross sectional view of a keyless insertion lock from FIG. 49.

FIG. 44 is a perspective view of the rotor stem of keyless insertion barrel lock with biasing means. As illustrated, a cupped bushing design is provided wherein a bushing 12' is an alternate embodiment of bushing 12, 112 and 209 and performs the same functions. The cupped reliefs 601 in bushing 12' encompasses the ball bearings 10, 110 and 210. The shape of the relief matches the radius of the ball bearings plus some clearance to allow a slip fit to permit the ball to actuate within case 1, 101 or 201 and rotor stem 3 or rotor stem 103 or plunger stem 203. Bushing 12' shrouds access to internal mechanics of the lock when the cupped relief 601 mates with the ball bearings. The benefits include improving reliability by reducing the possibility of debris entering the lock, which may hamper operation of keyless insertion or keyed operation. Another potential benefit is reducing access to internal components of lock, which inhibits nefarious tampering efforts to disable or retard proper lock functions.

Regarding another example embodiment including at least a pivot plunger, and referring also to FIGS. 45-51 generally, in one alternative embodiment of invention is to replace ball bearings with a toggle. In the presented embodiment toggles are urged into the locked position by a biasing means as described in FIGS. 21-30. The plunger stem 603 supports and positions a pivot pin 612. The toggles also have through holes that mate with the pivot pin 612. A slot at the distal end of plunger stem 603 accommodates the toggles that are free to move within slot 230 while urged to the locked position by biasing means. When the lock is inserted into an aperture, the toggles pivot upon the pin to recede with case 201. Regarding another example embodiment including at least a pivot cut slot, and referring also to FIGS. 45-51 generally, in one alternative embodiment cases 1, 101, and 201 provide an opening 30, 130 and 230 in which ball bearings articulate to enable keyless insertion of the lock. The opening can be manufactured in multiple ways. One alternative embodiment is case 701 is a sloped angle on the proximal end of the slot to produce surface 701d. Surface 701c is normal to axis of case and rotor stem. One possible method of producing the opening is milling a hole and pivoting the part relative to the cutting mill. A benefit of the sloped geometry is a reduced opening. A reduced opening minimizes the necessary length of the ball retaining features 701a and 701b. Additionally, a smaller opening inhibits entry of debris into the lock, which may impair proper functioning or frustrate attempts to defeat proper operation. The sloped geometry may improve product reliability by improving ruggedness when lock is abused or aggressively inserted into an ill-fitting receptacle. The slope in this embodiment matches that of the ball path defined by the rotor stem, which is 45 degrees.

Another example embodiment below refers to the following figures: FIG. 52 is a perspective view of locking pin in the locked condition. FIG. 53 is a sectional view of locking pin in the locked condition. FIG. 54 is a sectional view of locking pin in the unlocked condition. FIG. 55 is a sectional view of locking pin with biasing members displaced and ball bearings recessed within case. FIGS. 52-55 generally, apply to a locking pin, often called "quick release pins," which typically require manually pushing a button to actuate a locking member holding the ball bearings from the lock position to allow the balls to recede into the pin body for either insertion or extraction from a receptacle. This invention enable insertion without manually actuating a locking member, but does require actuation of locking member for extraction. Referencing FIG. 52, pin body 801 and handle 802 and ball bearings 804 resembles typical quick release pin. The locking member 803 translates along axis defined by case 801. The end of locking member 803 protruding from handle 802 is pushed by an operator to manually unlock the pin by translating locking member recesses into alignment with ball bearings 804. FIG. 53 shows assembly in the locked condition and FIG. 54 shows the assembly in the unlocked position. Biasing means 805 causes the lock to be in the locked position without forceful actuation. The ball bearing 804 are held in position relative to locking member by biasing members spring 808 and bushing 807. When pin is inserted into a receptacle without actuating locking member, the balls are pushed by reaction forces from receptacle toward handle along axis of pin body 801 and inward to enter into locking member 803 recess.

Figure 56:
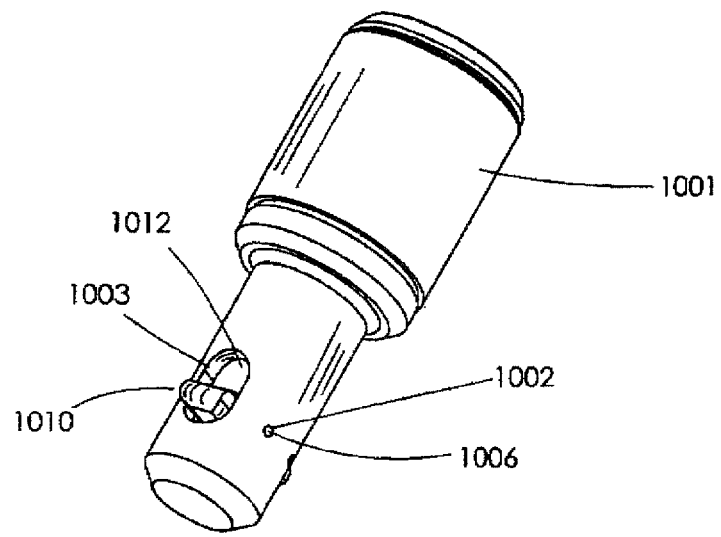
FIG. 56 is a perspective view of a keyless insertion lock with alternate locking means in accord with one possible embodiment of the invention.
Figure 57:
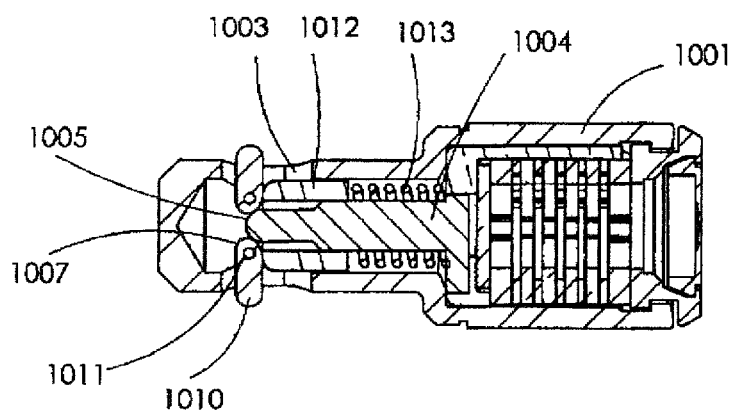
FIG. 57 is a perspective views of an alternate keyless insertion lock from FIG. 56.
Figure 58:
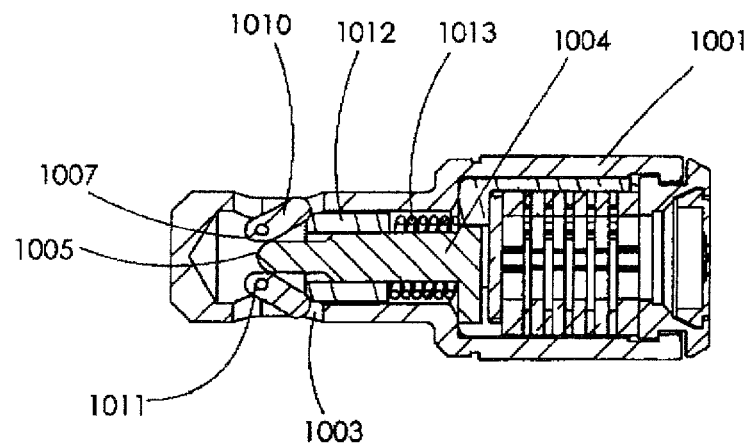
FIG. 58 is a perspective views of an alternate keyless insertion lock from FIG. 56.
Figure 59:
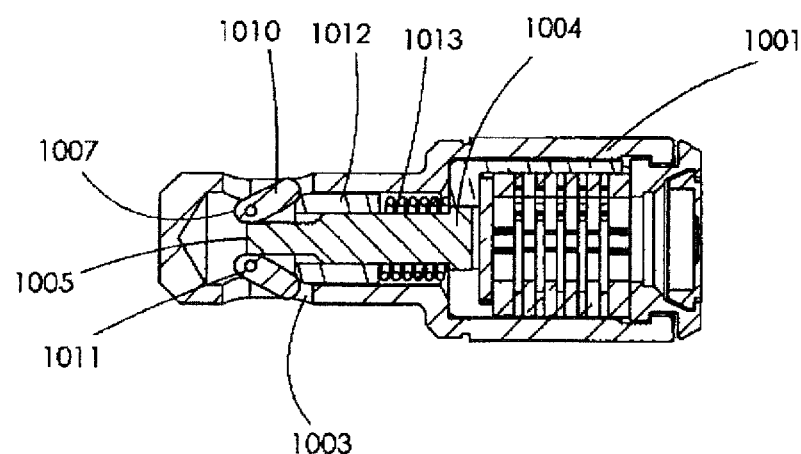
FIG. 59 is a perspective views of an alternate keyless insertion lock from FIG. 56.
Figure 60:
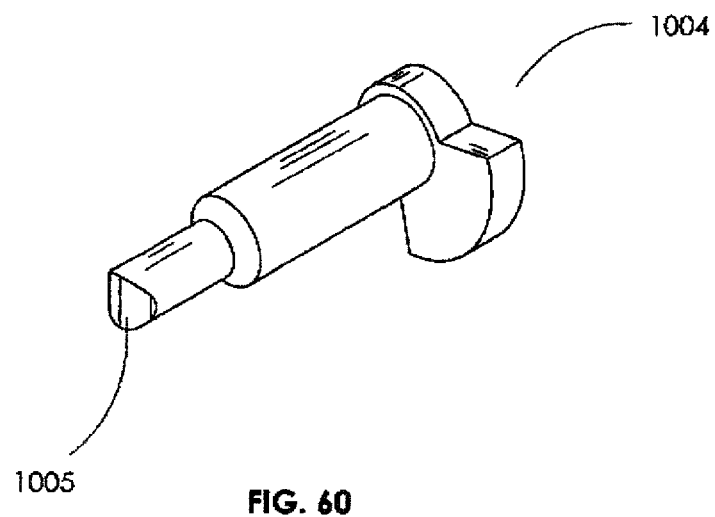
FIG. 60 is a perspective view of an alternate rotor stem from alternate keyless insertion lock depicted in FIG. 56.
Figure 61:
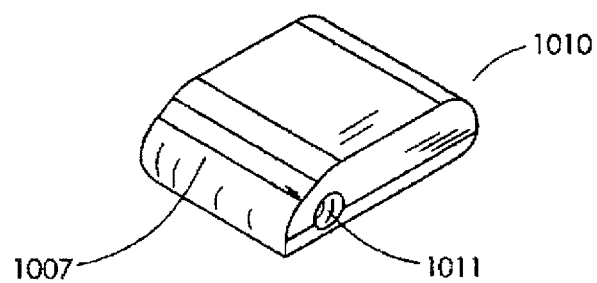
FIG. 61 is a perspective view of an alternate locking means from alternate keyless insertion lock depicted in FIG. 56.

Another example embodiment below refers to the following figures: FIG. 56 is a perspective view of lock in the locked condition with rotor stem in the locked position. FIG. 57 is a sectional view of lock in the locked condition with rotor stem in the locked position. FIG. 58 is a sectional view of lock with rotor stem in the locked position and toggles receded during keyless insertion. FIG. 59 is a sectional view of lock in the unlocked condition with rotor stem in the unlocked position. FIG. 60 is an isometric view of the rotor stem. FIG. 61 is an isometric view of the toggle (Note items 1000 series. Case 1001, Case pivot holes 1002, Case slot 1003, Toggles 1010, Toggle holes 1011, Toggle cam surface 1007, Bushing 1012, Spring 1013, Rotor Stem 1004, Rotor Stem cam surface 1005, Pivot pin 1006). This embodiment of the invention utilizes toggles 1010 in a rotary lock instead of ball bearings. The toggles 1010 rotates about a pivot pin 1006 and within slot 1003 of case 1001. The toggles 1010 recede into housing during keyless insertion and recover into locked extended position after passing through receiver aperture by urging from a biasing means provided by bushing 1012 and spring 1013. The pivot pin 1006 passes through holes 1002 and 1011 in the lock case 1001 and toggles 1010. A rotating rotor stem 1004 pushes the toggles 1010 into an unlocked receded position when turned about axis defined by case 1001. The actuation of the toggles 1010 by rotor stem 1004 is caused by a cam surface on the rotor stem 1005 bearing against toggle surface 1007. When the rotor stem 1004 is turned to the locked position, contact between surfaces 1007 and 1005 is absent and the toggles freely return to locked position by urging of biasing means.

While the present invention has been shown in example embodiments comprising disk tumbler barrel locks, it may also be used in many other types of barrel locks as well as retaining pins and other devices where retractable retaining members would be useful.

Figure 62:
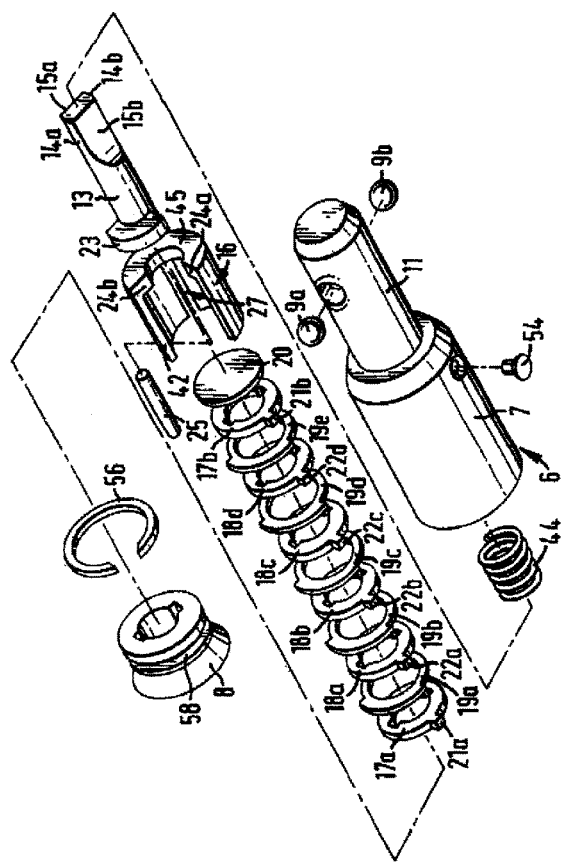
FIG. 62 is an exploded perspective view of a locking apparatus, as noted herein, including reference numerals that correlate with those as provided in FIG. 2 of U.S. Pat. No. 4,742,703 referred to herein, but in other example embodiments of the present invention, the referenced structure may be combined with that shown above in FIGS. 1-20 as noted.

A further description, and in some instances a summary outline, is provided identifying various aspects of example embodiments in conjunction with FIGS. 1-62, as applicable, and related descriptions with regard to various views of embodiments including certain members, components, structures, and configurations in accord with possible embodiments of the invention. It should be recognized that regarding cost issues, in an example embodiment, the present invention addresses: the speed of installation, in that the lock is field installable without a key or other tool and may be pushed in to install, with a uni-directional ball release; a lower cost labor pool, in that there is less concern over worker honesty (i.e., in view of the above, as noted, the lock is field installable without a key or other tool and may be pushed in to install, with a uni-directional ball release); the lower skill requirement in regards to simple operation (i.e., in view of the above, push in to install, with a uni-directional ball release (referred to herein as a "pushed in to install" aspect)): less training, again, in view of the simple operation (i.e., "pushed in to install"), and as noted, again, the lock is field installable without a key or other tool and may be pushed in to install, with a uni-directional ball release; no key tracking required for installers (i.e., again, in view of the above, as noted, the lock is field installable without a key or other tool and may be pushed in to install, with a uni-directional ball release); cannot be locked inadvertently (it can be inserted through multiple locking layers (with a uni-directional ball release)).

In addition, it should be recognized that regarding cost issues, in an example embodiment, the present invention addresses manufacturing costs related to: simpler components being required (i.e., simpler spring), simpler assembly (fewer components) in that components drop in place (i.e., no rotation orientation required, no special fixtures, no special tools) and in that the lock does not have to be shipped in an opened orientation.

It should be further recognized that regarding reliability issues, in an example embodiment, the present invention provides: better assurance that the lock is properly installed in that audible or tactile feedback informs the user when the lock is installed correctly (e.g., audible click, tactile click) and in that the lock can be fully inserted to a proper locking position without locking in the wrong position; self locking in that the locking members are biased to a locking position with the uni-directional ball release feature; the lock is not subject to pre-mature locking before installation (i.e., in view of the uni-directional ball release); a reduced tolerance requirement regarding the position of the locking ball engagement with the rotor stem, in that the holding surface engagement created for engagement with balls is larger and the balls are allowed to travel in an axial direction to enter the notch in the rotor stem and further that the ball hole is obround; the rotor stem is better located in the shaft of lock (e.g., sleeve centralizes rotor stem); elimination of ball sticking in locked position.

In addition, it should be recognized that regarding ease of use, in an example embodiment, the present invention fosters user friendliness in that: the lock can be installed easily with gloves (e.g., "pushed in to install" feature); an audible or tactile feedback informs the user when the lock is installed correctly (e.g., audible click, tactile click); it is simple to operate and provides one-handed installation (i.e., in view of the above, as noted, pushed in to install, with a uni-directional ball release).

It should also be recognized that regarding application specific performance, in an example embodiment, the present invention fosters better security in that; there is better key control; the lock is field installable without a key or other tool (i.e., in view of the above, as noted, pushed in to install, with a uni-directional ball release); the lock can be used in many different types of hardware and in many types of barrel locks; the lock provide tamper resistance.

Additionally, it will also be appreciated that various problems were recognized and resolved to reach a workable design related to: shaping the rotor stem to receive and hold the locking balls; the angle of the notches on the rotor stem; balancing abruptness with the length on the entry side of the notch and coordinating and configuring the angle to be tangent with the ball when retracted and at the upper limit of the obround slot; captivation of balls; shaping of the ball hole opening; smoothness of insertion involving better location of the rotor stem in the shaft of the lock (e.g., sleeve centralizes rotor stem) and allowing the locking balls to travel in the axial direction to enter the notch in the rotor stem (with the obround ball hole); choosing spring forces to balance extension of the balls with resistance to insertion.

It should be noted that in an example embodiment, the invention includes at least the following components: case (or rotor-lock case); rotor (or rotor-lock rotor); rotor stem (or rotor-lock stem); top tumbler; fence; base guard; spacer; code tumbler; end cap; ball bearing; weather seal (SI, rubber); sleeve or bushing (which is adapted to bear on locking balls to bias expansion); spring (compressed-uncompressed); sampler receiver. It should be noted that in another example embodiment related to a plunger lock configuration, the invention includes at least the following components: plunger case; plunger cap; plunger stem; plunger decoy; plunger lock spring; weather seal, SI, rubber; o-ring; plunger snap spring; plunger bushing; BB; sampler receiver. It should be noted that in example embodiments, the invention provides various configurations related to and including at least: case is upset, ball retaining, left; case is upset, ball retaining, right; case, slot, proximal end; case, slot, distal; case, slot; rotor stem, notch angle, proximal; rotor stem, distal. It should also be noted that in other example embodiments, the invention provides alternates such as a: leaf spring, alternate biasing means; proximal bend member; distal bend member; extension (leaf) member; band; proximal angle; distal angle; wire leaf spring, alternate biasing means; rotor stem relief pocket; rotor stem relief pocket, end; wire leaf spring, deflecting member; wire leaf spring, vertical member; wire leaf spring, horizontal end member; angle of deflecting member; cupped recess in alternate bushing; toggles; alternate plunger stem; toggle pivot pin; case; handle; plunger stem; ball bearings; plunger spring; bushing, biasing means; spring, biasing means; case upset, ball retaining, left, same, but shorter; case upset, ball retaining, right, same, but shorter; case, slot, proximal end, same; and case, slot, distal end, angled.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The foregoing disclosure and description of embodiments of the invention is illustrative and explanatory of the above and variations thereof, and it will be appreciated by those skilled in the art, that various changes in the design, organization, order of operation, means of operation, equipment structures and location, methodology, the use of mechanical equivalents, such as different types of other locking hardware, receiving hardware, fasteners and locking devices than as illustrated whereby different steps may be utilized, as well as in the details of the illustrated construction or combinations of features of the various elements may be made without departing from the spirit of the embodiments of the invention. As well, the drawings are intended to describe various concepts of embodiments of the invention so that presently preferred embodiments of the invention will be plainly disclosed to one of skill in the art but are not intended to be manufacturing level drawings or renditions of final products and may include simplified conceptual views as desired for easier and quicker understanding or explanation of embodiments of the invention. As well, the relative size and arrangement of the components may be varied from that shown and the embodiments of the invention still operate well within the spirit of the embodiments of the invention as described hereinbefore and in the appended claims. Thus, various changes and alternatives may be used that are contained within the spirit of the embodiments of the invention.

Accordingly, the foregoing specification is provided for illustrative purposes only, and is not intended to describe all possible aspects of the example embodiments of the invention. It will be appreciated by those skilled in the art, that various changes in the ordering of steps, ranges, interferences, spacings, hardware, and/or attributes and parameters, as well as in the details of the illustrations or combinations of features of the methods and system discussed herein, may be made without departing from the spirit of the embodiments of the invention. Moreover, while various embodiments of the invention have been shown and described in detail, those of ordinary skill in the art will appreciate that changes to the description, and various other modifications, omissions and additions may also be made without departing from either the spirit or scope thereof.

REFERENCES

The following references and those included in the Summary of Invention, to the extent that they provide exemplary procedural or other details supplementary to those set forth herein, are specifically incorporated herein by reference.
U.S. Pat. No. 4,742,703

What is claimed is:

1. A method for installing a barrel lock in electric utility locking hardware, the method comprising:
    providing a barrel lock comprising a body and a retractable locking member, wherein the retractable locking member comprises an extended position and a retracted position, wherein the retractable locking member is in the extended position;
    inserting the barrel lock in hardware capable of receiving the barrel lock, wherein the barrel lock is not in the hardware prior to the inserting;
    exerting an external force in a first direction directly by the hardware on the retractable locking member during the inserting;
    biasing the retractable locking member to oppose the exerting an external force; and
    causing the locking member to retract to the retracted position into the body so as to allow insertion of the barrel lock into the hardware.

2. The method of claim 1, further comprising exerting an external force in a second direction directly by the hardware on the retractable locking member, wherein the retractable locking member is prevented from retracting to the retracted position.

3. The method of claim 1, wherein the retractable locking member is in the most extended position prior to exerting the external force.

4. The method of claim 1, further comprising exerting an external force directly on the retractable locking member in a second direction generally opposite to the first direction, wherein the retractable locking member is prevented from retracting to a retracted configuration.

5. The method of claim 1, further comprising exerting an external force in a second direction directly by electric utility locking hardware on the retractable locking member, wherein the retractable locking member is prevented from retracting to the retracted position.

6. The method of claim 1, wherein the barrel lock comprises a locked configuration, and wherein the retractable locking member is in an extended position in the locked configuration.

7. The method of claim 6, wherein the barrel lock further comprises an unlocked configuration wherein the retractable locking member is retractable when the barrel lock is in the unlocked configuration and when the barrel lock is being removed in a second direction from the hardware.

8. The method of claim 1, wherein barrel lock is self-locking when installed in the hardware.

9. The method of claim 1, wherein the retractable locking member is resiliently biased to a locked configuration.

10. The method of claim 1, wherein the barrel lock comprises a uni-directional release configuration wherein the retractable locking member comprises a uni-directional release.

11. The method of claim 1, wherein the retractable locking member comprises a locking ball.

12. The method of claim 11, wherein the barrel lock comprises a uni- directional release configuration wherein the locking ball comprises a uni-directional release.

13. A locking apparatus for use with electric utility locking hardware, the apparatus comprising:
- a barrel lock insertable into electric utility locking hardware, the barrel lock comprising a body comprising a head portion and a shaft portion, and further comprising at least one retractable locking member, and a biasing member configured to bias the at least one retractable locking member, wherein the retractable locking member comprises an extended position and a retracted position, the biasing member biasing the retractable locking member to the extended position;
- wherein the electric utility locking hardware is configured for receiving the barrel lock, and wherein the barrel lock is not in the electric utility locking hardware prior to inserting the barrel lock into the electric utility locking hardware;
- wherein an external force may be exerted in a first direction directly by the electric utility locking hardware on the at least one retractable locking member during the inserting, the biasing member biasing the retractable locking member to oppose exerting an external force; and
- wherein the at least one retractable locking member is retractable to the retracted position into the body when the external force is exerted in a first direction directly by the electric utility locking hardware on the at least one retractable locking member so as to allow insertion of the barrel lock into the electric utility locking hardware.

14. The locking apparatus of claim 13, further comprising exerting an external force in a second direction directly by the electric utility locking hardware on the at least one retractable locking member, wherein the at least one retractable locking member is prevented from retracting to the retracted position.

15. The locking apparatus of claim 14, wherein the at least one retractable locking member is in the most extended position prior to exerting the external force.

16. The locking apparatus of claim 13, wherein the barrel lock comprises a locked configuration, and wherein the at least one retractable locking member is in an extended position in the locked configuration.

17. The locking apparatus of claim 16, wherein the barrel lock further comprises an unlocked configuration wherein the at least one retractable locking member is retractable when the barrel lock is in the unlocked configuration and when the barrel lock is being removed in the second direction from the locking hardware.

18. The locking apparatus of claim 13, wherein barrel lock is self-locking when installed in the locking hardware.

19. The locking apparatus of claim 13, wherein the barrel lock comprises a uni-directional release configuration wherein the at least one retractable locking member comprises a uni-directional release.

20. The locking apparatus of claim 13, wherein the at least one retractable locking member comprises at least one locking ball, wherein the barrel lock comprises a uni-directional release configuration wherein the at least one locking ball comprises a uni-directional release.

* * * * *